US011501787B2

(12) United States Patent
Gfeller et al.

(10) Patent No.: US 11,501,787 B2
(45) Date of Patent: Nov. 15, 2022

(54) SELF-SUPERVISED AUDIO REPRESENTATION LEARNING FOR MOBILE DEVICES

(71) Applicant: Google LLC, Mountain View, CA (US)

(72) Inventors: Beat Gfeller, Zurich (CH); Dominik Roblek, Meilen (CH); Félix de Chaumont Quitry, Zurich (CH); Marco Tagliasacchi, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 347 days.

(21) Appl. No.: 16/548,146

(22) Filed: Aug. 22, 2019

(65) Prior Publication Data
US 2021/0056980 A1   Feb. 25, 2021

(51) Int. Cl.
*G10L 19/035*  (2013.01)
*G06N 20/00*  (2019.01)
*G10L 19/038*  (2013.01)
*G10L 25/18*  (2013.01)

(52) U.S. Cl.
CPC ............ *G10L 19/035* (2013.01); *G06N 20/00* (2019.01); *G10L 19/038* (2013.01); *G10L 25/18* (2013.01)

(58) Field of Classification Search
CPC ..... G10L 19/035; G10L 25/18; G10L 19/038; G06N 20/00
See application file for complete search history.

(56) References Cited

U.S. PATENT DOCUMENTS

| 5,394,508 | A  | * | 2/1995 | Lim .......................... G10L 3/02 395/2.38 |
| 6,205,253 | B1 | * | 3/2001 | King ....................... G06K 9/36 382/236 |
| 9,905,223 | B2 | * | 2/2018 | Shivappa ................ G06F 17/00 |
| 10,127,918 | B1 | * | 11/2018 | Kamath Koteshwara ................... G10L 21/02 |
| 11,043,214 | B1 | * | 6/2021 | Hedayatnia ............. G10L 15/19 |
| 2017/0169833 | A1 | * | 6/2017 | Lecomte ................. G10L 19/20 |

(Continued)

OTHER PUBLICATIONS

Agüera y Areas et al, "Now Playing: Continuous Low Power Music Recognition", arXiv:1711v1, Nov. 29, 2017, 5 pages.

(Continued)

*Primary Examiner* — Richemond Dorvil
*Assistant Examiner* — Ethan Kim
(74) *Attorney, Agent, or Firm* — Dority & Manning, P.A.

(57) ABSTRACT

Systems and methods for training a machine-learned model are provided. A method can include can include obtaining an unlabeled audio signal, sampling the unlabeled audio signal to select one or more sampled slices, inputting the one or more sampled slices into a machine-learned model, receiving, as an output of the machine-learned model, one or more determined characteristics associated with the audio signal, determining a loss function for the machine-learned model based at least in part on a difference between the one or more determined characteristics and one or more corresponding ground truth characteristics of the audio signal, and training the machine-learned model from end to end based at least in part on the loss function. The one or more determined characteristics can include one or more reconstructed portions of the audio signal temporally adjacent to the one or more sampled slices or an estimated distance between two sampled slices.

18 Claims, 11 Drawing Sheets

(56) References Cited

U.S. PATENT DOCUMENTS

| | | | |
|---|---|---|---|
| 2018/0204578 A1* | 7/2018 | Atti | G10L 19/008 |
| 2019/0035113 A1* | 1/2019 | Salvi | G06T 9/00 |
| 2019/0043239 A1* | 2/2019 | Goel | G06T 13/20 |
| 2019/0156819 A1* | 5/2019 | Shafran | G10L 15/16 |
| 2019/0164052 A1* | 5/2019 | Sung | G06N 3/08 |
| 2020/0234720 A1* | 7/2020 | Sung | G10L 19/02 |
| 2021/0082444 A1* | 3/2021 | Fejgin | G10L 19/022 |
| 2021/0166705 A1* | 6/2021 | Chang | G10L 19/038 |
| 2021/0217404 A1* | 7/2021 | Jia | G10L 13/04 |
| 2021/0335381 A1* | 10/2021 | Park | G10L 25/30 |

OTHER PUBLICATIONS

Arandjelovic' et al, "Objects that Sound", arXiv:1712v2, Jul. 25, 2018, 20 pages.
Bonawitz et al, "Towards Federated Learning at Scale: System Design", arXiv:1902v2, Mar. 22, 2019, 15 pages.
Bretan et al, "Learning and Evaluating Musical Features with Deep Autoencoders", arXiv:1706v2, Jun. 15, 2017, 8 pages.
Chan et al, "Listen, Attend and Spell", arXiv:1508v2, Aug. 20, 2015, 16 pages.
Chung et al, "Audio Word2Vec: Unsupervised Learning of Audio Segment Representations using Sequence-to-sequence Autoencoder", arXiv:1603v4, Jun. 11, 2016, 5 pages.
Chung et al, "Speech2Vec: A Sequence-to-Sequence Framework for Learning Word Embeddings from Speech", arXiv:1803v2, Jun. 9, 2018, 5 pages.
Chung et al, "Unsupervised Cross-Modal Alignment of Speech and Text Embedding Spaces", arXiv:1805v2, Sep. 20, 2018, 11 pages.
Cramer et al, "Look, Listen and Learn More: Design Choices for Deep Audio Embeddings", Conference on Acoustic, Speech and Signal Processing, May 12-17, 2019, Brighton, United Kingdom, pp. 3852-3856.
Doersch et al, "Multi-task Self-Supervised Visual Learning", arXiv:1708v1, Aug. 25, 2017, 13 pages.
Doersch et al, "Unsupervised Visual Representation Learning by Context Prediction", arXiv:1505v3, Jan. 16, 2016, 10 pages.
Dosovitskiy et al, "Discriminative Unsupervised Feature Learning with Exemplar Convolutional Neural Networks", arXiv:1406v2, Jun. 19, 2015, 14 pages.
Fernando et al, "Self-Supervised Video Representation Learning With Odd-One-Out Networks", arXiv:16Hv4, Apr. 5, 2017, 10 pages.
Frankle et al, "The Lottery Ticket Hypothesis: Finding Sparse, Trainable Neural Networks", arXiv:1803v5, Mar. 4, 2019, 42 pages.
Gao et al, "Learning to Separate Object Sounds by Watching Unlabeled Video", arXiv:1804v2, Jul. 26, 2018, 19 pages.
Gemmeke et al, "Audio Set: An Ontology and Human-Labeled Dataset for Audio Events" Conference on Acoustics, Speech and Signal Processing, Mar. 5-9, 2017, New Orleans, Louisiana, 5 pages.
Gidaris et al, "Unsupervised Representation Learning by Predicting Image Rotations", arXiv:1803v1, Mar. 21, 2018, 16 pages.
GitHub, "Look, Listen and Learn More: Design Choices for Deep Audio Embeddings", https://github.com/marl/13embedding, retrieved on Aug. 5, 2019, 2 pages.
Hershey et al, "CNN Architectures for Large-Scale Audio Classification", arXiv:1609v2, Jan. 10, 2017, 5 pages.
Howard et al, "MobileNets: Efficient Convolutional Neural Networks for Mobile Vision Applications", arXiv:1704v1, Apr. 17, 2017, 9 pages.
Jansen et al, "Unsupervised Learning of Semantic Audio Representations", arXiv:1711v1, Nov. 6, 2017, 5 pages.
Kaggle, Data Science Company "Spoken Language Identification", https://www.kaggle.com/toponowicz/spoken-language-identification, retrieved on Aug. 6, 2019, 3 pages.
Korbar et al, "Cooperative Learning of Audio and Video Models from Self-Supervised Synchronization", Conference on Neural Information Processing Systems, Dec. 3-8, 2018, Montreal, Canada, 19 pages.
Lee et al, "Unsupervised Feature Learning for Audio Classification Using Convolutional Deep Belief Networks", Conference on Neural Infoimation Processing Systems, Dec. 7-10, 2009, Vancouver, Canada, 9 pages.
Matejka et al, "Analysis of DNN Approaches to Speaker Identification", Conference on Acoustics, Speech and Signal Processing, Mar. 20-25, 2016, Shanghai, China, pp. 5100-5104.
Mesaros et al, "Detection and Classification of Acoustic Scenes and Events", Transactions on Audio, Speech and Language, 2017, 15 pages.
Meyer et al, "Unsupervised Feature Learning for Audio Analysis", arXiv:1712v1, Dec. 11, 2017, 4 pages.
Mikolov et al, "Efficient Estimation of Word Representations in Vector Space," arXiv:1301v3, Sep. 7, 2013, 12 pages.
Misra et al, "Shuffle and Learn: Unsupervised Learning using Temporal Order Verification", arXiv:1603v2, Jul. 26, 2016, 21 pages.
Noroozi et al, "Unsupervised Learning of Visual Representation by Solving Jigsaw Puzzles", arXiv:1603v3, Aug. 22, 2017, 19 pages.
Owens et al, "Audio-Visual Scene Analysis with Self-Supervised Multisensory Features", arXiv:1804v2, Oct. 9, 2018, 19 pages.
Owens et al, "Learning Sight from Sound: Ambient Sound Provides Supervision for Visual Learning", arXiv:1712v1, Dec. 20, 2017.
Panayotov et al, "LibriSpeech: An ASR Corpus Based on Public Domain Audio Books", Conference on Acoustics, Speech and Signal Processing, Apr. 19-24, 2015, Brisbane, Australia, 5 pages.
Pascual et al, "Learning Problem-agnostic Speech Representations from Multiple Self-supervised Tasks", arXiv:1904v1, Apr. 6, 2019, 5 pages.
Pathak et al, "Context Encoders: Feature Learning by Inpainting", arXiv:1604v2, Nov. 21, 2016, 12 pages.
Pathak et al, "Learning Features by Watching Objects Move", arXiv:1612v2, Apr. 12, 2017, 10 pages.
Sandler et al, "MobileNetV2: Inverted Residuals and Linear Bottlenecks", arXiv:1801v4, Mar. 21, 2019, 14 pages.
Snyder et al, "MUSAN: A Music, Speech, and Noise Corpus", arXiv:1510v1, Oct. 28, 2015, 4 pages.
Stowell et al, "Automatic Acoustic Detection of Birds through Deep Learning: the First Bird Audio Detection Challenge", arXiv:1807v1, Jul. 16, 2018, 21 pages.
Tagliasacchi et al, "Self-Supervised Audio Representation Learning for Mobile Devices", Conference on Neural Information Processing Systems, Dec. 8-14, 2019, Vancouver, Canada, 11 pages.
Van den Oord et al, "Representation Learning with Contrastive Predictive Coding", arXiv:1807v2, Jan. 22, 2019, 13 pages.
Warden, "Speech Commands: A Dataset for Limited-Vocabulary Speech Recognition", arXiv:1804v1, Apr. 9, 2018, 11 pages.
Wei et al, "Learning and Using the Arrow of Time", Computer Vision and Pattern Recognition Conference, Jun. 18-22, 2018, Salt Lake City, Utah, 9 pages.
Xu et al, "Unsupervised Feature Learning Based on Deep Models for Environmental Audio Tagging", arXiv:1607v2, Nov. 29, 2016, 12 pages.
Zhang et al, "Colorful Image Colorization", arXiv:1603v5, Oct. 5, 2016, 29 pages.

* cited by examiner

SELF-SUPERVISED AUDIO REPRESENTATION LEARNING FOR MOBILE DEVICES

FIELD

The present disclosure relates generally to self-supervised audio representation learning. More particularly, the present disclosure relates to systems and methods which use unlabeled training data to train a machine-learned model using self-supervised learning to reconstruct portions of an audio signal or to estimate the distance between two portions of an audio signal.

BACKGROUND

Recent advances in supervised audio learning have allowed models to be trained that are able to successfully perform different tasks, such as audio annotation, music recognition, automatic speech recognition, speaker identification, and other tasks. Some supervised models can also be deployed on mobile devices by applying network pruning and quantization techniques. However, supervised audio learning suffers several shortcomings. For example, supervised audio learning requires collecting large annotated datasets specific to each task to be solved. Additionally, in a typical implementation, separate models are trained for each task, making it difficult to reuse computational resources when multiple such models are deployed on a mobile device. Moreover, because inference is performed on device but model training is typically performed at the server side using datasets representing surrogate distributions, the training dataset may potentially differ from the true data distribution.

SUMMARY

Aspects and advantages of embodiments of the present disclosure will be set forth in part in the following description, or can be learned from the description, or can be learned through practice of the embodiments.

One example aspect of the present disclosure is directed to a method for training a machine-learned model configured to determine one or more characteristics associated with an audio signal. The method can include obtaining an audio signal. The audio signal can include an unlabeled audio signal. The method can further include sampling the audio signal to select one or more sampled slices. The method can further include inputting the one or more sampled slices into a machine-learned model comprising an encoder network and decoder network. The method can further include receiving, as an output of the machine-learned model, one or more determined characteristics associated with the audio signal. The one or more determined characteristics can include one or more reconstructed portions of the audio signal temporally adjacent to the one or more sampled slices or an estimated distance between two sampled slices. The method can further include determining a loss function for the machine-learned model based at least in part on a difference between the one or more determined characteristics and one or more corresponding ground truth characteristics of the audio signal. The method can further include training the machine-learned model from end to end based at least in part on the loss function.

Another example aspect of the present disclosure is directed to a computing system comprising at least one processor, a machine learned audio reconstruction model, and at least one tangible, non-transitory computer-readable medium that stores instructions that, when executed by the at least one processor, cause the at least one processor to perform operations. The machine-learned audio reconstruction model can include an encoder network. The encoder network can include a plurality of convolutional layers. The encoder network can be trained to receive one or more sampled slices of an audio signal and output a respective embedding for each of the one or more sampled slices of the audio signal. The machine-learned audio reconstruction model can further include a decoder network. The decoder network can include an identical copy of at least a subset of the plurality of convolutional layers arranged in a reverse order. The decoder network can be trained to receive the respective embedding for each of the one or more sampled slices of the audio signal and output one or more reconstructed portions of the audio signal. The operations can include obtaining the audio signal. The operations can further include selecting the one or more sampled slices of the audio signal. The operations can further include inputting the one or more sampled slices of the audio signal into the encoder network of the machine-learned model. The operations can further include receiving, as an output of the encoder network, the respective embedding for each of the one or more sampled slices of the audio signal. The operations can further include inputting the respective embedding for each of the one or more sampled slices of the audio signal into the decoder network of the machine-learned model. The operations can further include receiving, as an output of the decoder network, the one or more reconstructed portions of the audio signal. The one or more reconstructed portions of the audio signal can correspond to one or more portions of the audio signal temporally adjacent to the one or more sampled slices of the audio signal. The machine-learned audio reconstruction model can be trained from end to end using a training dataset comprising unlabeled audio signals and a mean square error loss function.

Another example aspect of the present disclosure is directed to a computer-implemented method for determining an estimated time distance between two sampled slices of an audio signal. The computer-implemented method can include obtaining an audio signal. The computer-implemented method can further include sampling the audio signal to select a first sampled slice and a second sampled slice separated by a temporal gap. The computer-implemented method can further include analyzing the first sampled slice and the second sampled slice with a machine-learned model. The machine-learned model can include an encoder network and a decoder network. The machine-learned model can be trained from end to end using unlabeled audio signals and a cross-entropy loss function. The computer-implemented method can further include receiving, as an output of the machine-learned model, the estimated time distance between the first sampled slice and the second sampled slice.

Other aspects of the present disclosure are directed to various systems, methods, apparatuses, non-transitory computer-readable media, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
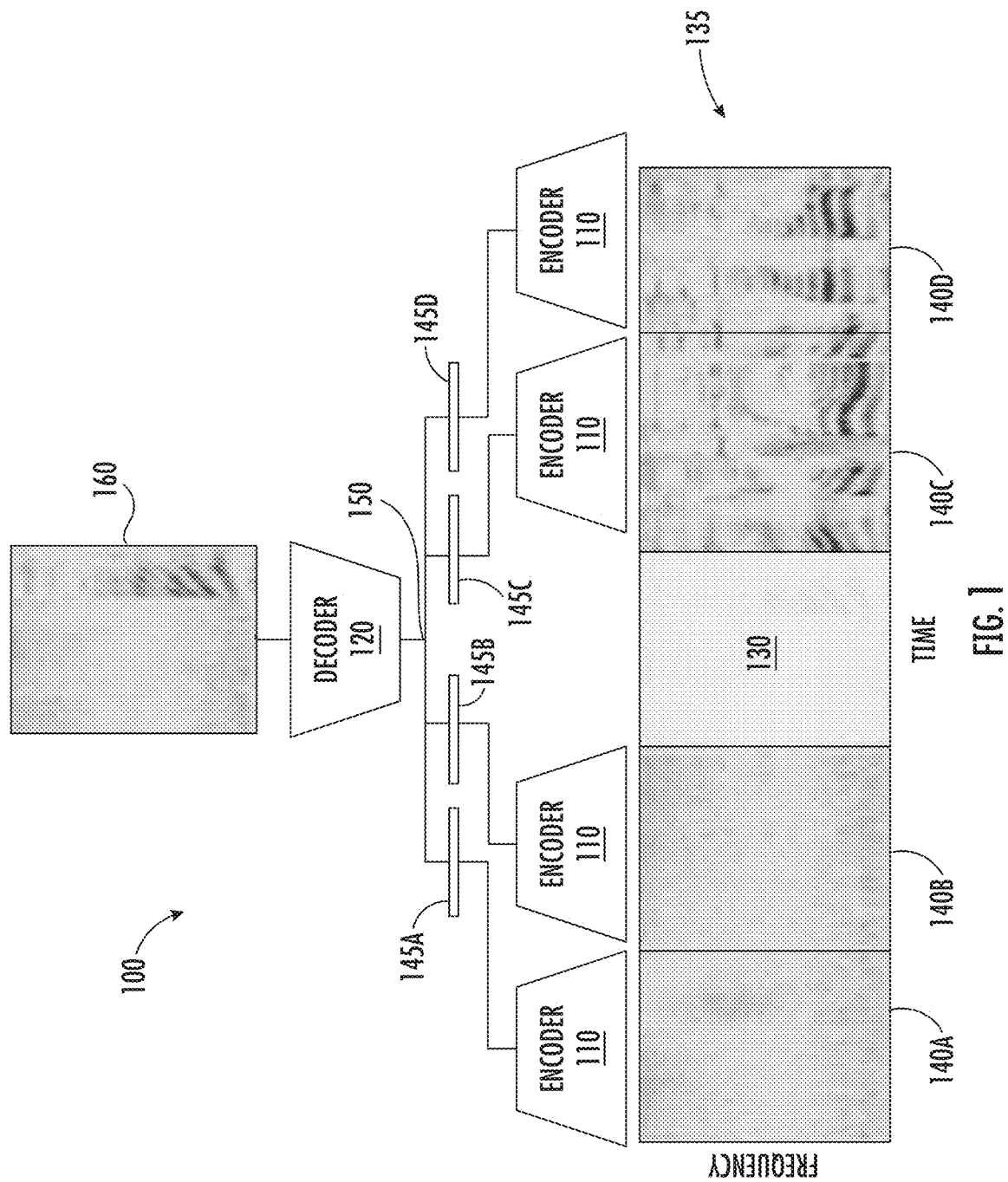
FIG. 1 depicts an example machine-learned model for reconstructing an audio slice according to example aspects of the present disclosure.

FIG. depicts a flow chart diagram of an example method to estimate a distance between two audio slices using a machine-learned model according to example aspects of the present disclosure.

Reference numerals that are repeated across plural figures are intended to identify the same features in various implementations.

DETAILED DESCRIPTION

Overview

Generally, the present disclosure is directed to systems and methods for self-supervised learning for machine-learned models which can determine characteristics associated with an audio signal using unlabeled training datasets. In particular, a training method can include obtaining an audio signal, which can be an unlabeled audio signal in a training dataset. The audio signal can be sampled to select one or more slices. For example, in some implementations, the audio signal can be converted to a log-mel spectrogram, and one or more spectrogram slices can be input into the machine-learned model. The machine-learned model can include an encoder network and one or more decoder networks, and can be configured to output one or more determined characteristics associated with the audio signal. For example, in some implementations, the one or more determined characteristics can include one or more reconstructed portions of the audio signal temporally adjacent to the one or more sampled slices or an estimated distance between two sampled slices. For example, in some implementations, two slices of an audio signal separated by a temporal gap can be input the machine-learned model, and a reconstructed portion of the audio signal corresponding to at least a portion of the temporal gap can be output by the machine-learned model. A loss function can then be determined for the machine-learned model based at least in part on a difference between the one or more determined characteristics and one or more corresponding ground truth characteristics of the audio signal. For example, a reconstructed portion of the audio signal can be compared to a corresponding ground truth portion of the audio signal. The machine-learned model can then be trained from end to end based at least in part on the loss function.

More particularly, the systems and methods of the present disclosure provide for self-supervised learning of audio representations using a small model architecture which can be deployed on mobile devices during both training and inference. Moreover, the systems and methods of the present disclosure allow for contextual temporal information to be exploited using general audio signals without resorting to any form of explicit supervision. For example, by solving properly designed tasks that involve the temporal context, high level semantic information can be extracted from the underlying raw data, thus leading to reusable embeddings.

For example, in some implementations, a self-supervised learning task can be applied to audio spectrograms. As examples, an audio signal can be converted to a log-mel spectrogram, a short-time Fourier transform (STFT), or other suitable signal, and one or more spectrogram slices of the audio signal can be sampled.

According to example aspects of the present disclosure, a machine-learned model can be trained by use of an auxiliary task which consists of reconstructing a temporal slice of predetermined duration from a number of past and future sampled slices. For example, two or more slices can be separated by a temporal gap. One or more slices preceding the temporal gap and one or more sampled slices following the temporal gap can be input into the machine-learned model. In some implementations, any two successive sampled slices (e.g., two successive sampled slices preceding the temporal gap) can be non-overlapping sampled slices separated by one or more temporal frames to reduce or eliminate leakage between the two successive sampled slices during training.

In some implementations, the machine-learned model can include an encoder network which includes a plurality of convolutional layers, a max pooling layer, and a fully connected layer. The machine-learned model can further include a decoder network which can include an identical copy of at least a subset of the plurality of convolutional layers arranged in a reverse order with the max pooling layer replaced by a nearest-neighbor up sampling layer.

The machine-learned model can be trained to perform the task of reconstructing one or more slices corresponding to at least a portion of the temporal gap. For example, a ground truth portion of the audio signal corresponding to the reconstructed portion of the audio signal can be compared to the reconstructed portion of the audio signal, and a loss function can be determined. For example, the loss function can be a mean-square error loss function and can be determined based at least in part on a difference between the ground truth portion of the audio signal and the reconstructed portion of the audio signal. The machine-learned model can then be trained from end to end based at least in part on the loss function, such as, for example, using stochastic gradient descent (SGD) or other suitable training method.

According to additional example aspects of the present disclosure, in some implementations, a machine-learned model can be trained by use of an auxiliary task which consists of reconstructing one or more preceding and/or successive temporal slices from a single sampled slice. For example, a single sampled slice can be input into the machine-learned model, and a reconstructed preceding portion of the audio signal temporally adjacent to the single sampled slice and a reconstructed successive portion of the audio signal temporally adjacent to the single sampled slice can be determined by the machine-learned model.

In some implementations, the machine-learned model can include an encoder network comprising a plurality of convolutional layers, a max pooling layer, and a fully connected layer. The machine-learned model can further include a decoder network comprising an identical copy of at least a subset of the plurality of convolutional layers arranged in a reverse order, with the last convolutional layer comprising twice as many output channels as the encoder network. A first set of the output channels can be associated with reconstructing the preceding portion of the audio signal and a second set of the output channels can be associated with the reconstructed successive portion of the audio signal.

The machine-learned model can be trained using corresponding ground truth portions of the audio signal corresponding to the reconstructed preceding portion and the reconstructed successive portion of the audio signal. For example, a loss function can be an average mean-square loss function determined based at least in part on a difference between the respective ground truth portions and reconstructed portions of the audio signal. The machine-learned model can then be trained from end to end based at least in part on the loss function, such as by SGD.

According to additional example aspects of the present disclosure, in some implementations, a machine-learned model can be trained by use of an auxiliary task which consists of estimating a time distance between two sampled slices. For example, the first slice and a second slice can be sampled, and the two sampled slices can be separated by a temporal gap. In some implementations, the two sampled slices can be extracted at random.

In some implementations, the encoder network can include a plurality of convolutional layers, and each sampled slice can be input into the encoder network to determine a respective embedding representation. The two embedding representations can then be concatenated into a single vector, and the single vector can be input into a fully connected feed forward network to obtain a scalar output. The scalar output can be representative of the estimated time distance.

The machine-learned model can be trained using a corresponding ground truth temporal gap. For example, the ground truth temporal gap can be the actual absolute value of the time distance of the two sampled slices, and the loss function can be a cross-entropy loss between the ground truth temporal gap and the estimated time distance between the first sampled slice and the second sampled slice. The machine-learned model can be trained from end to end based at least in part on the loss function.

In some implementations, the machine-learned model can be a multi-head machine-learned model comprising an encoder network and a plurality of decoder networks. Each decoder network can be configured to perform a different auxiliary task. One or more sampled slices can be input into the encoder network to obtain one or more respective embeddings. The one or more respective embeddings can then be input into each decoder network to obtain one or more respective determined characteristics associated with the audio signal. For example, the one or more respective determined characteristics can include reconstructed portions of the audio signal and/or an estimated time distance between two sampled slices. Each different task can have an associated loss function which uses corresponding ground truth characteristics of the audio signal and the one or more respective determined characteristics associated with the audio signal for each auxiliary task. The machine-learned model can then be trained from end to end based at least in part on the task specific loss functions.

Once trained, the machine-learned models according to example aspects of the present disclosure can be used to determine one or more characteristics of an audio signal. For example, a trained encoder network can be coupled with a corresponding decoder network to perform a particular task, such as reconstructing one or more portions of the audio signal which are temporally adjacent to one or more sampled slices input into the machine-learned model, and/or estimating a time distance between two sampled slices. Further, the machine-learned models according to example aspects of the present disclosure can leverage lightweight encoder networks suitable for use on mobile computing devices.

The systems and methods of the present disclosure provide a number of technical effects and benefits. For example, the systems and methods of the present disclosure allow for self-supervised learning of machine-learned models by formulating one or more auxiliary tasks using unlabeled data to train the model to solve the auxiliary task(s). By solving the auxiliary task(s), the machine-learned model can learn general purpose representations in a lower dimensional embedding space. This can allow for the embedding encoder network, (e.g., the portion of the model architecture mapping the input data to the embedding space) to be reused as a feature extractor for different downstream tasks. Further, by training the encoder network using a variety of auxiliary tasks, computational resources used for training each auxiliary task can refine the encoder network, and can therefore provide a benefit for training other auxiliary tasks.

As another example technical effect and benefit, the systems and methods of the present disclosure can be deployed on device, such as on mobile computing devices, where no explicit labeling of the data is available. Additionally, by leveraging the recent advances in federated learning, the systems and methods can allow for the training process to be distributed across numerous devices, thus training models directly on a true data distribution, while fully preserving users' privacy. For example, the small encoder architectures of the present disclosure can be suitably deployed on mobile devices. Further, during training, this can allow for a more accurate and representative training dataset distribution to be used, particularly when coupled with federated learning. Moreover, during inference, the systems and methods of the present disclosure allow for shared computational resources to be leveraged across different tasks by using a common embedding encoder.

The systems and methods of the present disclosure can also provide an improvement to computing technology, particularly in the area of unsupervised (e.g., self-supervised) learning of machine-learned models. For example, an unlabeled audio signal can be sampled to select one or more sampled slices. The one or more sampled slices can be input into the machine-learned model comprising an encoder network and a decoder network. One or more determined characteristics associated with the audio signal can be received as an output of the machine-learned model. For example, the one or more determined characteristics can include one or more reconstructed portions of the audio signal temporally adjacent to the one or more sampled slices and/or an estimated distance between two sampled slices. A loss function can be determined for the machine-learned model based at least in part on a difference between the one or more determined characteristics and one or more corresponding ground truth characteristics of the audio signal. For example, a task-specific loss function can be determined for each particular task. In some implementations, a plurality of tasks can be trained concurrently using embeddings received from the encoder network. The machine-learned model can then be trained from end to end based at least in part on the loss function(s).

With reference now to the FIGS., example aspects of the present disclosure will be discussed in further detail.

Example Self-Supervised Learning Models and Training Methods

Figure 2:
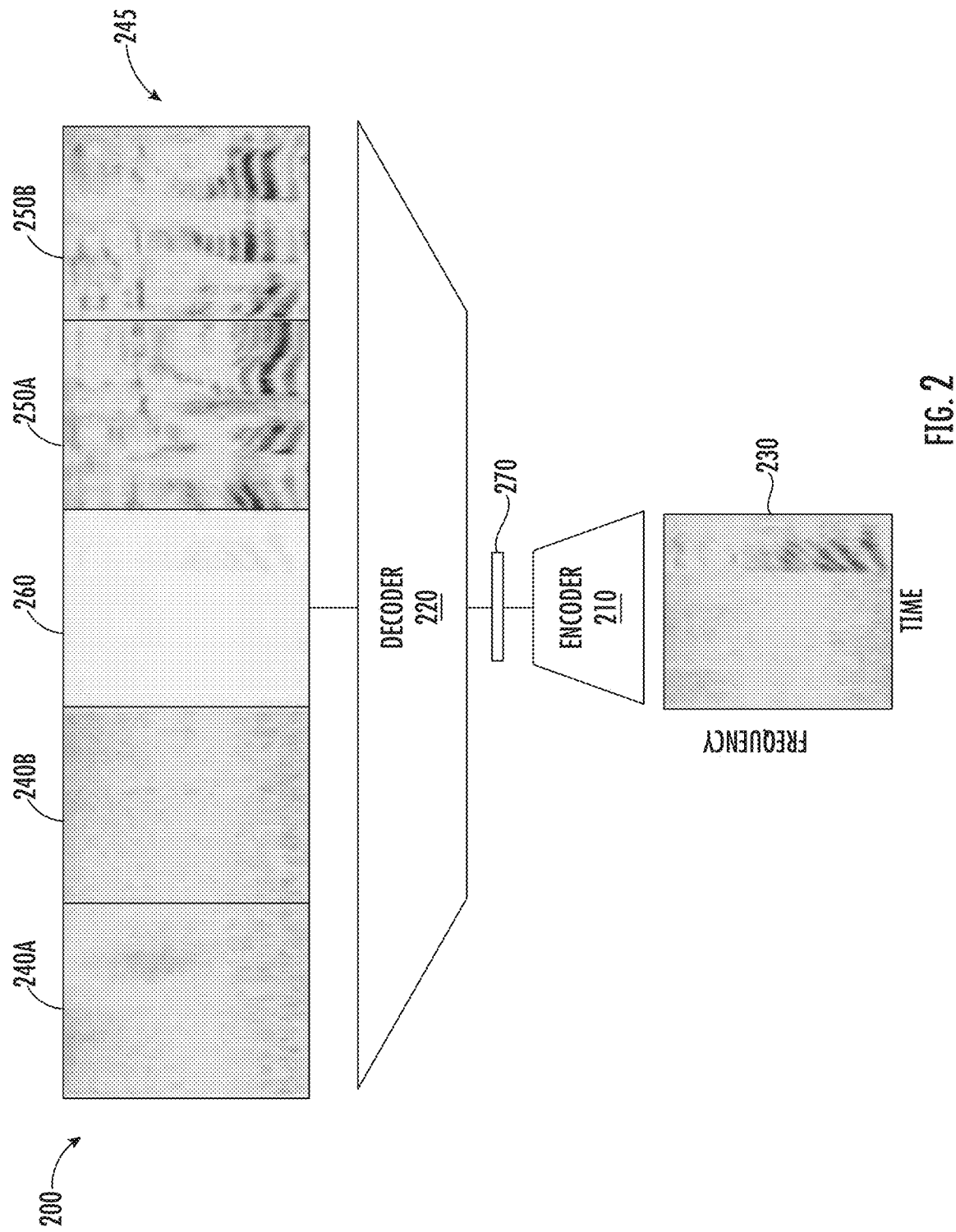
FIG. 2 depicts an example machine-learned model for reconstructing a preceding audio slice and successive audio slice according to example aspects of the present disclosure.
Figure 3:
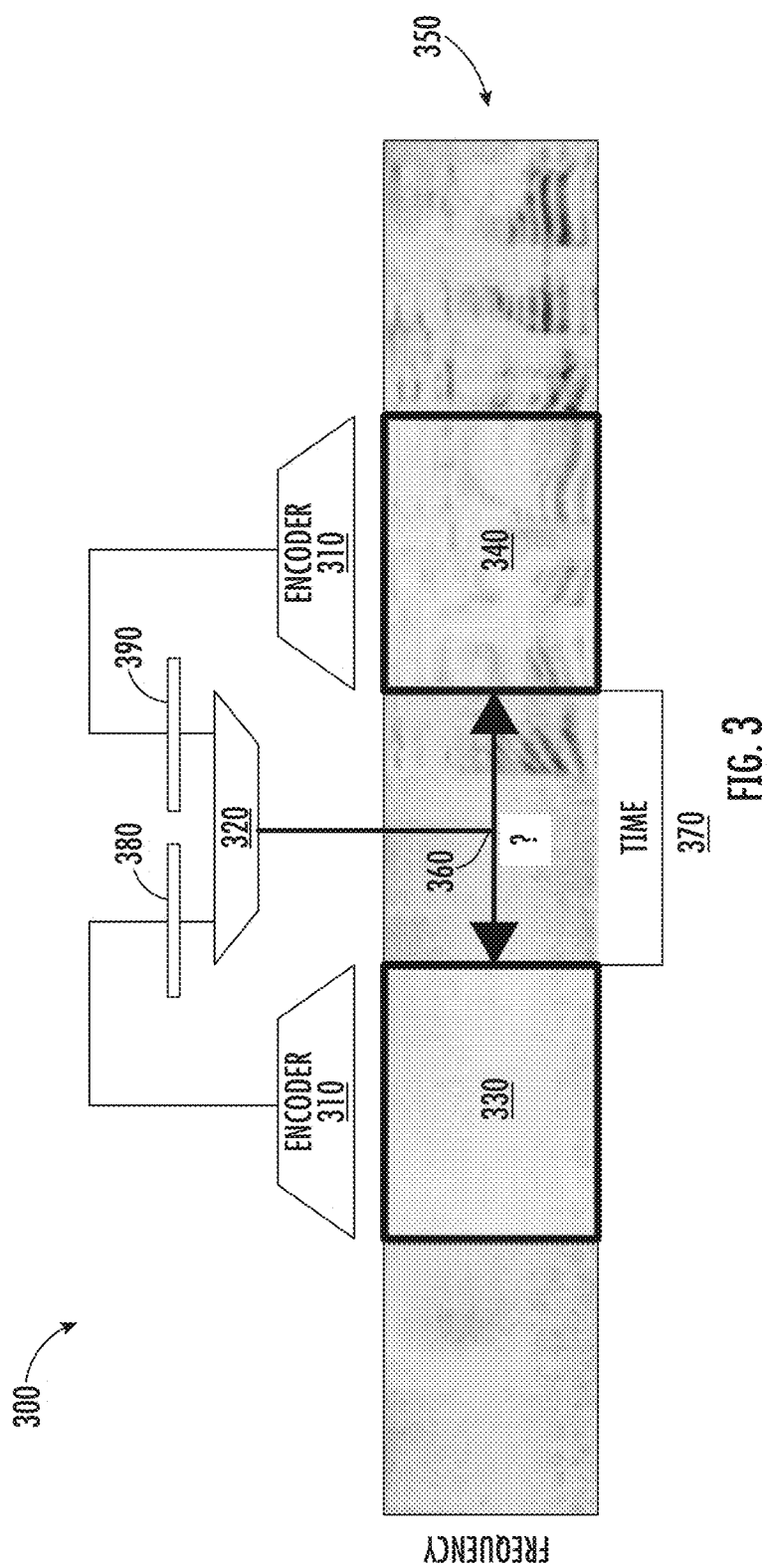
FIG. 3 depicts an example machine-learned model for estimating a time distance between two audio slices according to example aspects of the present disclosure.

FIGS. 1-3 depict example self-supervised learning models according to example aspects of the present disclosure. Each of the models depicted in FIGS. 1-3 can be trained using unlabeled training data, which can comprise unlabeled audio signals. For example, let $x=\{x_1, x_2, \ldots, x_n\}$ denote an audio clip of n samples in the time domain and $X \in \mathbb{R}^{T \times F}$ the corresponding real-valued log-mel spectrogram (or other converted audio signal), which consists of T temporal frames and F frequency bins. Let $X_i$ denote a N×F slice of the spectrogram X, starting at frame i with N<T temporal frames and $z_i=\text{Enc}(X_i)$ a d-dimensional embedding computed by processing the input spectrogram $X_i$ with an encoder Enc( ). An example encoder network architecture according to example aspects of the present disclosure is detailed with respect to FIG. 4. Each of the models depicted in FIGS. 1-3 can be described using this notation.

FIG. 1 depicts an example machine-learned model 100 for reconstructing an audio slice according to example aspects of the present disclosure, and can be referred to as a continuous-bag of words (CBoW) variant of an Audio2Vec model. The machine-learned model 100 can be trained using a self-supervised learning task. The machine-learned model 100 can include an encoder network 110 and a decoder network 120.

For example, to train the machine-learned model 100, a target slice 130 (depicted by the temporal gap in an audio signal 135) can be selected (e.g., sampled) at random, together with a set of surrounding sampled slices 140 which are used for prediction. Each of the sampled slices 130 and 140A-D of the audio signal 135 can be, for example, spectrogram slices (e.g., log-mel spectrogram slices, STFT slices, etc.) mapped to a frequency and time domain, as shown. Each of the sampled predictor slices 140A-D can be processed by the same encoder network 110, which maps its input into a respective fixed-dimensional embedding 145A-D for each sampled slice 140A-D, respectively. These respective embeddings 145A-D can then be concatenated (at 150) and fed into the decoder network 120. The decoder network 120 can have a similar architecture as the encoder network 110, and can be configured to compute a reconstruction 160 of the target slice 130 (also referred to as a reconstructed portion of the audio signal 135).

More specifically, let $X_{(0)}=X_i$ be a slice (e.g., target slice 130) selected at random from X (audio signal 135). Then, a set of past slices $(X_{(-P)}, \ldots X_{(-1)})$ (e.g., sampled slices 140A-B) and future slices $(X_{(1)}, \ldots, X_{(P)})$ (e.g., sampled slices 140A-D) are extracted from the same audio signal 135. The past slices 140A-B and the future slices 140 C-D can be separated by a temporal gap, which can correspond to the target slice 130. The temporal location of the slice $X_{(p)}$ can be equal to $X_{i+p(N+G)}$. Stated differently, the sampled slices 140A-B and/or 140C-D can be non-overlapping slices of size N, with an extra gap of G temporal frames between any two consecutive slices 140A-D. The gap between consecutive slices 140A-B and/or 140C-D can be used to avoid the self-supervised model 100 exploiting the leakage between adjacent slices 140A-D as a shortcut to solve the task. Each sampled slice (140A-D) can be analyzed by the same encoder network 110 to obtain $z_{(p)}=\text{Enc}(X_{(p)})$ (e.g., embeddings 145A-D, respectively). Then, a vector $z_{(0)}=[z_{(-P)}, \ldots, z_{(-1)}, z_{(1)}, \ldots z_{(P)}]$ can be obtained by concatenating the embeddings 145A-D of each of the predictor slices 140A-D (e.g., at 150) and fed into a convolutional decoder network 120 to obtain a reconstruction $\hat{X}_{(0)}=\text{Dec}(z_{(0)})$ (e.g., a reconstructed portion 160 of the audio signal 135 corresponding to the target slice 130 and at least a portion of the temporal gap between sampled slice 140B and 140C).

In some implementations, the architecture of the decoder network 120 can be obtained by reversing the order of at least a subset of the layers in the encoder network 110 and replacing max-pooling with nearest-neighbor upsampling.

The overall model 100 can then be trained end-to-end by minimizing the mean-square error loss function $\|X_{(0)}-\hat{X}_{(0)}\|$. For example, the target slice 130 (denoted by $X_{(0)}$) can correspond to a ground truth portion of the audio signal, and the loss function can be determined based at least in part on a difference between the target slice 130 and the reconstructed portion of the audio signal 160 (denoted by $\hat{X}_{(0)}$). The model 100 can be trained using any suitable training method, such as, for example, Stochastic Gradient Descent (SGD).

FIG. 2 depicts an example machine-learned model 200 for reconstructing a plurality of audio slices according to example aspects of the present disclosure, and can be referred to as a skip-gram variant of an Audio2Vec model. The machine-learned model 200 can similarly be trained using a self-supervised learning task. The machine-learned model 200 can include a similar architecture as the machine-learned model 100 depicted in FIG. 1, and can include an encoder network 210 and a decoder network 220.

The machine-learned model 200 can perform the opposite task as the machine-learned model 100. For example, given a single sampled slice 230, the machine-learned model 200 can predict one or more preceding portions 240A-B and one or more successive portions 250A-B of an audio signal 245. For example, the preceding portions 240A-B and the successive portions 250A-B can be separated by a temporal gap 260 corresponding to the single sampled slice 230. The sampled slice 230 and the predicted slices (e.g., portions 240A-B and successive portions 250A-B) can be, for example, spectrogram slices (e.g., log-mel spectrogram slices, STFT slices, etc.) mapped to a frequency and time domain, as shown. The single sampled slice 230 can be processed by the encoder network 210, which maps its input into a fixed-dimensional embedding 270. The embedding 270 can then be fed into the decoder network 220. The decoder network 220 can have a similar architecture as the encoder network 210, but with twice as many channels. Each channel can be configured to compute a corresponding reconstructed portion (e.g., 240A-B or 250A0B) of the audio signal 245.

For example, the encoder network 210 can compute the embeddings 270 of the middle slice $z_{(0)}=\text{Enc}(X_{(0)})$ (single sampled slice 230), and then the decoder network 220 can reconstruct the surrounding slices, i.e., $[\hat{X}_{(-P)}, \ldots \hat{X}_{(-1)}, \hat{X}_{(1)}, \ldots, \hat{X}_{(P)}] = \text{Dec}(z_{(0)})$ (preceding portions 240A-B and successive portions 250A-B).

In some implementations, the decoder network 220 of the machine-learned model 200 can be identical to the decoder network 120 used by the machine-learned model 100 (the CBoW variant of the Audio2Vec model), except the last convolutional layer has 2P output channels, one for each of the slices to be reconstructed (e.g., one for preceding portion(s) 240A-B, and one for successive portion(s) 250A-B).

The overall model 200 can then be trained end-to-end by minimizing the average mean-square error computed across the 2P reconstructed slices. For example, a first ground truth portion(s) of the audio signal 245 can correspond to the reconstructed preceding portion(s) 240A-B of the audio signal 245 and a second ground truth portion(s) of the audio signal 245 can correspond to the reconstructed successive portion(s) 250A-B of the audio signal 245. The loss function can be determined based at least in part on an average of the differences between the first ground truth portion(s) and the preceding portion(s) 240A-B and the second ground truth portion(s) and the successive portion(s) 250A-B. The model 200 can be trained using any suitable training method, such as, for example, SGD.

FIG. 3 depicts an example machine-learned model 300 for estimating a time distance between two sampled slices of an audio signal according to example aspects of the present disclosure, and can be referred to as a TemporalGap model. The machine-learned model 300 can be trained using a self-supervised learning task. The machine-learned model 300 can include an encoder network 310 and a decoder network 320.

For the TemporalGap task, the machine-learned model 300 can be configured to estimate the absolute value of the distance in time 360 between two slices 330 and 340 of the same audio clip 350. In some implementations, the two sampled slices 330 and 340 can be sampled at random from the audio clip 350.

More specifically, in some implementations, the machine-learned model 300 can sample the ground truth temporal gap 370 from a uniform distribution, e.g., $\Delta \sim \mathcal{U}(0, N_{max}-N)$, where N and $N_{max}$ are the lengths (in time frames) of the slices 330/340 and the original audio signal 350, respectively. The normalized temporal gap can be defined as $\delta = \Delta/(N_{max}-N) \in [0,1]$. Then, two slices $X_i$ (e.g., first sampled slice 330) and $X_j$ (e.g., second sampled slice 340) can be extracted such that $\Delta = |i-j|$. The machine-learned model 300 need not impose a temporal order between the two sampled slices 330/340. The sampled slices 330/340 can then be input into the same encoder 310 to determine respective embeddings 380 and 390. The embedding representations 380/390 can then be concatenated into a single 2d-dimensional vector $z = [\text{Enc}(X_i), \text{Enc}(X_j)]$. The vector z can then be fed into a fully connected feed forward network with a single hidden layer that produces a scalar output $\hat{\delta}$ indicative of the time distance between the two sampled slices 330/340 (e.g., an estimated time distance 360).

In some implementations, the machine-learned model 300 can then be trained end-to-end so as to minimize a cross-entropy loss $\mathcal{L}_{CE}(\delta, \hat{\delta})$ between the ground truth temporal gap 370 (denoted by $\delta$) and the predicted gap 360 (denoted by $\hat{\delta}$). In some implementations, the cross-entropy loss function may be preferred to a mean-square error $\|\delta - \hat{\delta}\|$ loss function because it gives more weight to errors when the ground truth temporal gap 370 $\delta$ is small.

Figure 4:
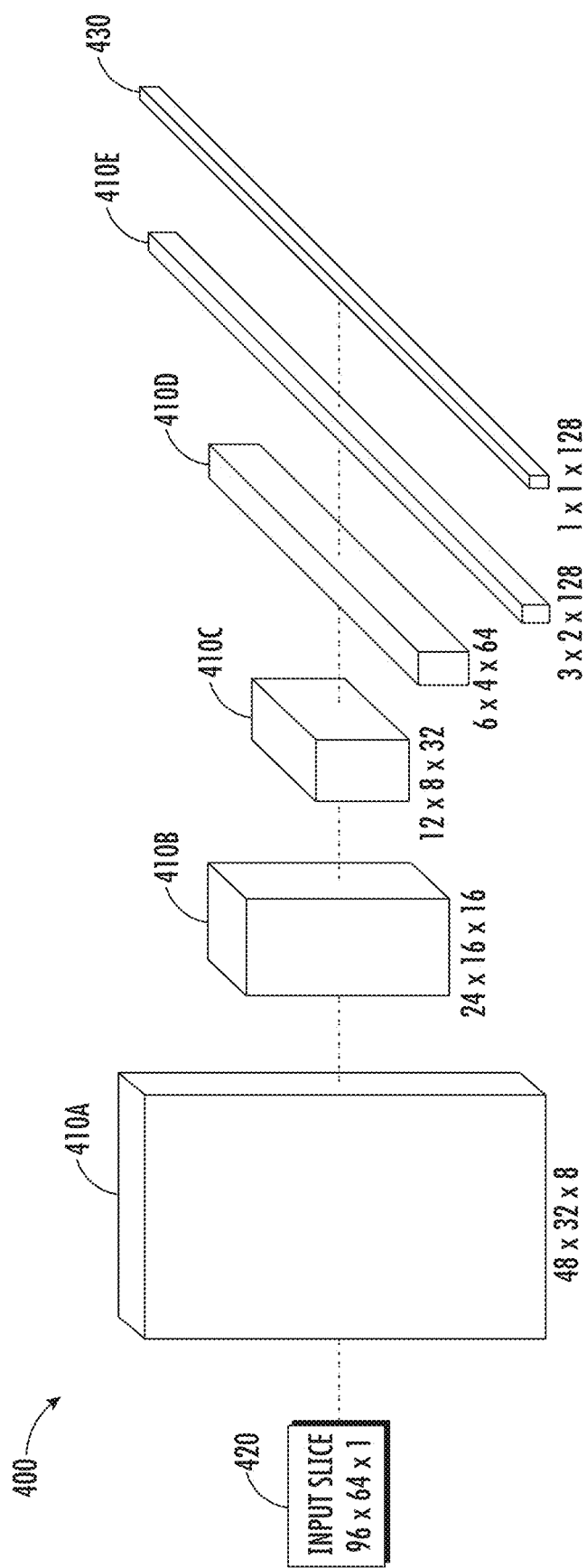
FIG. 4 depicts an example encoder network according to example aspects of the present disclosure.

FIG. 4 depicts an example encoder network 400 according to example aspects of the present disclosure. The encoder network 400 can be implemented in one or more machine-learned models, such as machine-learned models 100, 200, and 300 discussed herein.

As shown, the encoder network 400 can include one or more convolutional layers 410. For example, as shown, five convolutional layers 410A-E are depicted. The encoder network 400 can be configured to analyze sampled slices of an audio signal. For example, in some implementations, the encoder network 400 can process input sequences sampled at 16 kHz, with a window size of 25 ms and a hop size equal to 10 ms to compute the short-time Fourier transform (STFT) of the input slice 420. In some implementations, the encoder network 400 can further compute F=64 mel-spaced frequency bins in the range 60-7800 Hz.

For the encoder network 400, (e.g., Enc( )), a convolutional neural network comprising a plurality of convolutional layers 410 can be used. For example, an example encoder network 400 according to example aspects of the present disclosure is described in Table 1, which corresponds to the encoder network 400 depicted in FIG. 4,

TABLE 1

Example Encoder Network 400 architecture.

| | Output Size | Number of Parameters | FLOPs |
|---|---|---|---|
| Input layer 420 | 96 × 64 × 1 | — | — |
| Conv. layer 1 410A | 48 × 32 × 8 | 0.2k | 2.9M |
| Conv. layer 2 410B | 24 × 16 × 16 | 1k | 4M |
| Conv. layer 3 410C | 12 × 8 × 32 | 5k | 4M |
| Conv. layer 4 410D | 6 × 4 × 64 | 20k | 3.9M |
| Conv. layer 5 410E | 3 × 2 × 128 | 82k | 3.9M |
| FC layer 430 | 1 × 1 × 128 | 16k | 33k |
| Total | — | 125k | 18.7M |

Due to its limited size (approximately 125 k parameters) encoder network 400 can be potentially deployed on a mobile device and run in an energy-efficient way by exploiting streaming convolutions. Each convolutional layer 410 can include a series of two convolutions, one along the time axis (with size $3 \times 1 \times C_{in} \times C_{out}$) and one along the frequency axis (with size $1 \times 3 \times C_{in} \times C_{out}$), in parallel to a pointwise 1×1 convolution as a residual connection. In some implementations, all activation functions can be Rectified Linear Units (ReLUs) and batch normalization can be used in all convolutional layers 410. Each convolutional layer 410 can be followed by max-pooling, to reduce the time-frequency dimensions by a factor of two at each layer. Finally, a global max-pooling layer (not depicted) can produce a d-dimensional vector, which can be further processed by a fully-connected layer 430 to get the embeddings. In some implementations, the encoder network 400 can set N=96 (corresponding to 975 ms) and d=128, thus reducing the dimensionality of the raw audio samples by a factor of about 122.

As described herein, the encoder network 400 can be paired with a decoder network (not depicted) configured to perform a particular task. For example, a first decoder network can be configured to reconstruct a single portion of an audio signal corresponding to at least a portion of a temporal gap between two sampled slices, a second decoder network can be configured to reconstruct a preceding portion and successive portion of an audio signal surrounding a single sampled slice, and a third decoder network can be configured to estimate a time distance between two sampled slices, as described herein.

In some implementations, the decoder network(s) can further be configured to convert a reconstructed spectrogram slice of an audio signal to a corresponding reconstructed portion of the audio signal. For example, the decoder network can output a reconstructed spectrogram slice(s) (e.g., log-mel spectrogram, STFT slice, etc.), and perform a conversion on the reconstructed spectrogram slice(s) to obtain a corresponding portion of the audio signal.

Figure 5:
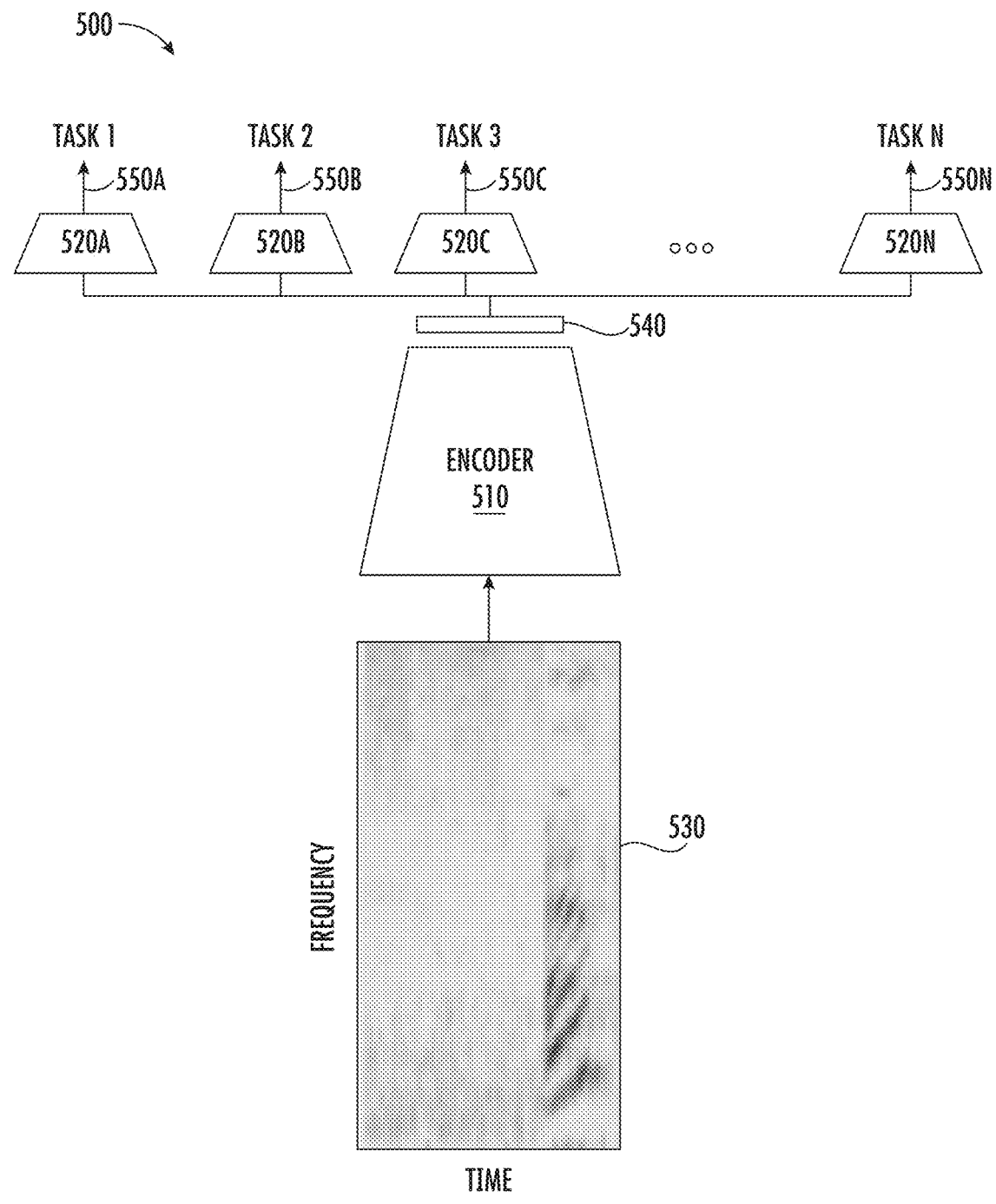
FIG. 5 depicts an example multi-head machine-learned model according to example aspects of the present disclosure.

Referring now to FIG. 5, an example multi-head machine-learned model 500 (also referred to as MultiHead) according to example aspects of the present disclosure is depicted. As shown, the multi-head machine-learned model 500 can include an encoder network 510 and a plurality of decoder networks 520A-N. Each decoder network 520A-N can be configured to perform a different auxiliary task. For example, a first decoder network 520A can be configured to reconstruct a single portion of an audio signal corresponding to at least a portion of a temporal gap between two sampled slices, a second decoder network 520B can be configured to reconstruct a preceding portion and successive portion of an audio signal surrounding a single sampled slice, a third decoder network 520C can be configured to estimate a time distance between two sampled slices, and additional decoder network(s) 520N can be configured to perform other auxiliary tasks.

According to additional aspects of the present disclosure, the multi-head machine-learned model 500 can receive (e.g., obtain, input, etc.) one or more sampled slice(s) 530. For example, the one or more sampled slices 530 can be input into the encoder network 510. The encoder network 510 can then determine one or more embeddings 540, as disclosed herein. The one or more embeddings 540 can then be input into each decoder network 520A-N, and one or more respective determined characteristics 550A-N associated with an audio signal can be received from each respective decoder network 520A-N. The one or more respective determined characteristics 550A-N can each be associated with the particular auxiliary task the decoder network 520A-N has been configured to perform.

Further, each different auxiliary task can have an associated corresponding loss function. For example, the one or more determined characteristics 550A-N for each particular task can be compared to one or more corresponding ground truth characteristics of the audio signal. As an example, an estimated time distance received from a decoder network 520C can be compared to a ground truth temporal gap, and the loss function for the decoder network 520C can be determined based at least in part on a difference between the estimated time distance and the corresponding ground truth temporal gap. The multi-head machine-learned model 500 can then be trained from end to end based at least in part on the respective task-specific loss functions. For example, the encoder network 510 and each decoder network 520A-N can be trained from end to end using each corresponding task-specific loss function. In this way, the encoder network 510 can be trained to learn embeddings via a variety of auxiliary tasks.

Example Experimental Results

The quality of the embeddings produced by the example models 100-500 produced by different self-supervised learning methods described herein have been evaluated according to two different measures: i) the accuracy of a fully supervised logistic regression model trained using the embeddings and the corresponding labels as inputs; and ii) the accuracy of a non-parametric nearest neighbors model that works directly in the embedding space.

The AudioSet dataset was initially used to train all the self-supervised learning tasks. AudioSet contains excerpts of 10 seconds from the soundtracks of YouTube videos. Although the dataset is annotated with labels of more than 500 classes, the labels were discarded during training and evaluation. Each AudioSet sample can be potentially reused multiple times during training, each time extracting a different target slice (together with surrounding slices) uniformly at random.

Additionally, six publicly available datasets were used to evaluate a variety of downstream tasks, covering both speech and non-speech related tasks. For example, the Speech Commands dataset was used to evaluate keyword spotting on 35 distinct keywords. The LibriSpeech dataset contains audio books read by 251 different speakers. 100 hours of the training set was used to evaluate a speaker identification task. The Spoken Language Identification dataset contains samples that belong to three different languages: English, Spanish and German, while the MUSAN dataset distinguishes across three classes, namely music, speech and noise. Finally, two datasets released in the context of the recent DCASE2018 Challenge, Bird Audio Detection and TUT Urban Acoustic Scenes 2018 were used, which contains labeled audio samples from 10 different urban environments.

Since each dataset is characterized by samples having different durations, during training the downstream datasets were preprocessed extracting equal-length slices uniformly at random from the original sample and assigning the corresponding label to all of the extracted slices. Input samples having the duration of T=975 ms were used, so as to match the size of the temporal slices used when training the self-supervised tasks. During evaluation, a sliding window of size T and a hop size of T/2 was applied, so as to obtain one or more predictions for each input sample, depending on its length. In order to aggregate such predictions and produce a single output for each sample, a simple naive-Bayes classifier was applied.

The different self-supervised models Audio2Vec, in its two variants, CBoW and skip-gram, and TemporalGap were trained on the Audioset dataset. For Audio2Vec, P=2 slices were used on each side of the target slice, and a gap of G=2 temporal frames between consecutive slices was used. The TripletLoss method was used for evaluation. More specifically, positive/negative pairs were obtained by extracting a slice from, respectively, the same or a different original sample. In addition, an AutoEncoder was also trained sharing the same encoder and decoder architectures as Audio2Vec. Different variants were trained, including denoising and variational autoencoders, but significant differences with respect to the default autoencoder were not observed. When evaluating the accuracy in downstream tasks, the portion of the model corresponding to the encoder was extracted and used to map input log-mel spectrograms to 128-dimensional embeddings.

The results were compared to two different fully supervised baselines based on a simple logistic regression model: i) the Spectrogram model receives directly the (flattened) spectrogram features as input; ii) the Untrained model computes the embeddings with the very same encoder architecture described herein, but using randomly initialized weights.

Because each auxiliary task is characterized by a different number of target classes and intrinsic difficulty, the accuracy was compared to the level attained by task-specific fully supervised models (Supervised), each using the same encoder, but trained end-to-end on each of the labeled downstream datasets. In addition, a MultiHead model was trained, where a single shared encoder is composed with a different fully connected layer for each downstream task. The MultiHead model provides an upper bound for the best expected performance, as it uses the same architecture as when using the self-supervised embeddings, but leverages the in-domain labeled data for end-to-end training.

All models were trained with stochastic gradient descent (SGD) and Adam optimizer with default hyperparameters. The learning rate was set to $10^{-3}$ for Audio2Vec, AutoEncoder, and all the supervised models, while it was set to $10^{-4}$ for TemporalGap and TripletLoss. A mini-batch size equal to 256 was used and training was stopped after approximately 2 days (on five Tesla V100 GPUs), thus iterating between 1.3 and 1.8 million mini-batches. In most cases, the accuracy of downstream tasks saturated after iterating over 500 k mini-batches. The evaluation results are shown in Table 2. Downstream tasks: SPC: (Speech Commands), LSP: (LibriSpeech), TUT: TUT Urban Acoustic Scenes 2018, MUS: MUSAN, BSD: Bird Audio Detection, LID: Spoken Language Identification. The highest accuracy attained by self-supervised models for each task is shown in bold.

the accuracy of the MUSAN downstream task increased as the reconstruction loss of Audio2Vec (skip-gram) decreased, and both tend to saturate after approximately 300 k iterations. For the same dataset, all self-supervised methods attained a level of accuracy that is in-between the baselines and the fully supervised benchmarks, with Audio2Vec (skip-gram) outperforming the other models on this task. The evaluation was repeated on all downstream tasks to obtain the results reported in Table 2. The level of accuracy is reported, with 95% confidence intervals capturing the uncertainty due to the finite size of the evaluation datasets. The accuracy normalized between 0% (Spectrogram) and 100% (Supervised) is reported in brackets. The self-supervised learning models described herein were able to recover between 11% and 98% of the accuracy of the Supervised model. Generally, Audio2Vec (skip-gram) and TripletLoss outperformed other self-supervised models. The best results were obtained on the MUSAN and LibriSpeech datasets, presumably because these tasks require capturing relatively stationary spectral characteristics of the inputs.

A similar evaluation was repeated working directly in the embedding space, by training a simple k-nearest neighbour classifier (k=10) on each dataset. More specifically, 975 ms samples were extracted at random from the original audio clips (10000 samples for training and 2000 samples for evaluation, for each dataset), and each sample was mapped to a 128-dimensional embedding. The classifier computed Euclidean distances directly in the embedding space. For the Spectrogram baseline, dimensionality reduction was performed by applying a random projection matrix sampled from a Gaussian distribution to map the flattened 96×64 spectrogram to a 128-dimensional space. Table 3 reports the results, showing that also in this case the proposed self-

TABLE 2

Accuracy on downstream tasks (and fraction of accuracy recovered wrt. baselines).

| Model | SPC | LID | LSP | MUS | TUT | BSD |
|---|---|---|---|---|---|---|
| Spectrogram | 0.16 ± .01 | 0.28 ± .04 | 0.97 ± .01 | 0.74 ± .01 | 0.36 ± .03 | 0.65 ± .02 |
|  | (+0%) | (+0%) | (+0%) | (+0%) | (+0%) | (+0%) |
| Untrained | 0.16 ± .01 | 0.48 ± .04 | 0.54 ± .02 | 0.93 ± .00 | 0.57 ± .03 | 0.70 ± .02 |
|  | (−1%) | (+33%) | (−1338%) | (+77%) | (+35%) | (+31%) |
| AutoEncoder | 0.28 ± .01 | 0.64 ± .04 | 0.99 ± .00 | 0.94 ± .00 | 0.59 ± .03 | 0.69 ± .02 |
|  | (+21%) | (+56%) | (+55%) | (+81%) | (+38%) | (+27%) |
| A2V(CBoW) | 0.30 ± .01 | 0.57 ± .04 | 0.99 ± .00 | 0.98 ± .00 | 0.66 ± .03 | 0.71 ± .01 |
|  | (+23%) | (+47%) | (+82%) | (+97%) | (+50%) | (+40%) |
| A2V(SG) | 0.28 ± .01 | 0.55 ± .04 | 1.00 ± .00 | 0.98 ± .00 | 0.67 ± .03 | 0.69 ± .02 |
|  | (+21%) | (+44%) | (+85%) | (+98%) | (+52%) | (+28%) |
| TemporalGap | 0.23 ± .01 | 0.45 ± .04 | 0.97 ± .01 | 0.97 ± .00 | 0.63 ± .03 | 0.71 ± .01 |
|  | (+12%) | (+27%) | (+11%) | (+92%) | (+44%) | (+44%) |
| TripletLoss | 0.18 ± .01 | 0.62 ± .04 | 1.00 ± .00 | 0.97 ± .00 | 0.73 ± .03 | 0.73 ± .01 |
|  | (+3%) | (+55%) | (+96%) | (+95%) | (+61%) | (+55%) |
| MultiHead | 0.72 ± .01 | 0.82 ± .03 | 1.00 ± .00 | 0.98 ± .00 | 0.94 ± .02 | 0.78 ± .01 |
|  | (+95%) | (+88%) | (+99%) | (+95%) | (+96%) | (+90%) |
| Supervised | 0.75 ± .01 | 0.90 ± .03 | 1.00 ± .00 | 0.99 ± .00 | 0.97 ± .01 | 0.79 ± .01 |
|  | (+100%) | (+100%) | (+100%) | (+100%) | (+100%) | (+100%) |

The prediction accuracy on the evaluation set of each of the six datasets is reported in Table 2. During training both the loss of the self-supervised task as well as the accuracy on each of the downstream tasks was monitored. For example, supervised models recover between 10% and 99% of the accuracy of the Supervised model. This demonstrates that salient representations of the underlying audio data are indeed captured directly in the embedding space.

TABLE 3

Accuracy on kNN classification (and fraction of accuracy recovered wrt. baselines).

| Model | SPC | LID | LSP | MUS | TUT | BSD |
|---|---|---|---|---|---|---|
| LightRed Spectrogram | 0.02 ± .01 | 0.39 ± .02 | 0.00 ± .00 | 0.10 ± .01 | 0.11 ± .01 | 0.49 ± .02 |
| LightRed | (+0%) | (+0%) | (+0%) | (+0%) | (+0%) | (+0%) |
| LightRed Untrained | 0.08 ± .01 | 0.38 ± .02 | 0.04 ± .01 | 0.87 ± .01 | 0.41 ± .02 | 0.68 ± .02 |
| LightRed | (+9%) | (−3%) | (+3%) | (+88%) | (+41%) | (+77%) |
| AutoEncoder | 0.24 ± .02 | 0.44 ± .02 | 0.03 ± .01 | 0.68 ± .02 | 0.52 ± .02 | 0.67 ± .02 |
|  | (+30%) | (+20%) | (+3%) | (+67%) | (+55%) | (+70%) |
| A2V(CBoW) | 0.14 ± .02 | 0.43 ± .02 | 0.10 ± .01 | 0.94 ± .01 | 0.52 ± .02 | 0.69 ± .02 |
|  | (+17%) | (+16%) | (+10%) | (+96%) | (+55%) | (+81%) |
| A2V(SG) | 0.12 ± .01 | 0.43 ± .02 | 0.26 ± .02 | 0.96 ± .01 | 0.60 ± .02 | 0.70 ± .02 |
|  | (+14%) | (+15%) | (+27%) | (+99%) | (+67%) | (+84%) |
| TemporalGap | 0.10 ± .01 | 0.37 ± .02 | 0.35 ± .02 | 0.92 ± .01 | 0.55 ± .02 | 0.70 ± .02 |
|  | (+11%) | (−10%) | (+36%) | (+93%) | (+60%) | (+84%) |
| TripletLoss | 0.09 ± .01 | 0.25 ± .02 | 0.69 ± .02 | 0.96 ± .01 | 0.70 ± .02 | 0.72 ± .02 |
|  | (+10%) | (−59%) | (+71%) | (+99%) | (+80%) | (+91%) |
| LightCyan MultiHead | 0.69 ± .02 | 0.52 ± .02 | 0.86 ± .02 | 0.95 ± .01 | 0.75 ± .02 | 0.75 ± .02 |
| LightCyan | (+91%) | (+52%) | (+89%) | (+97%) | (+88%) | (+102%) |
| LightCyan Supervised | 0.76 ± .02 | 0.63 ± .02 | 0.97 ± .01 | 0.97 ± .01 | 0.84 ± .02 | 0.74 ± .02 |
| LightCyan | (+100%) | (+100%) | (+100%) | (+100%) | (+100%) | (+100%) |

The results reported in Tables 2 and 3 used the AudioSet dataset to train the self-supervised models. The AudioSet dataset contains a wide variety of audio clips, including music, speech, ambient noise, acoustic events, etc. In order to evaluate the impact of the choice of the dataset, self-supervised training was repeated using LibriSpeech (discarding the speaker labels). LibriSpeech was chosen because the original samples are sufficiently long to support our self-learning tasks and because it contains audio of different content than AudioSet (i.e., speech only). In most cases, a decrease in the level of accuracy on downstream tasks was observed, especially for TemporalGap and TripletLoss, suggesting that a richer content variety in the training set is preferable when learning general-purpose audio representations.

The results reported in Tables 2 and 3 further focused on situations in which the encoder network is shared completely across different tasks, and only the last layer is allowed to learn task-specific parameters. However, training was also performed wherein the convolutional layers were also allowed to be retrained. In general, retraining the last two convolutional layers allowed recovery of most of the accuracy of the fully supervised model. Although the last two layers account for approximately 80% of the parameters, they only contribute to 20% of the FLOPs, and this is particularly useful when deploying on mobile devices.

Additionally, while the example models described herein are suitable for deployment on mobile devices, the proposed self-supervised methods can be applied also to larger models. An evaluation was also repeated by increasing the size of the encoder architecture described in Table 1. Namely, the number of channels in each convolutional layer was increased by a factor of 4, and the number of outputs in the last fully connected layer was increased to obtain 256-dimensional embeddings. Table 4 shows that the accuracy on downstream tasks increases, and Audio2Vec (skip-gram) achieves the highest accuracy on almost all datasets.

TABLE 4

Accuracy obtained when using a larger encoder architecture (relative change wrt. Table 2).

| Model | SPC | LID | LSP | MUS | TUT | BSD |
|---|---|---|---|---|---|---|
| AutoEncoder | 0.35 | 0.62 | 1.00 | 0.96 | 0.65 | 0.70 |
|  | (+24%) | (−3%) | (+1%) | (+2%) | (+10%) | (+1%) |
| A2V(SG) | 0.46 | 0.81 | 1.00 | 0.99 | 0.78 | 0.76 |
|  | (+64%) | (+47%) | (+0%) | (+1%) | (+16%) | (+10%) |
| TemporalGap | 0.37 | 0.77 | 1.00 | 0.98 | 0.73 | 0.74 |
|  | (+60%) | (+71%) | (+3%) | (+1%) | (+15%) | (+4%) |
| TripletLoss | 0.30 | 0.73 | 1.00 | 0.99 | 0.81 | 0.76 |
|  | (+66%) | (+17%) | (+0%) | (+2%) | (+10%) | (+4%) |

The evaluation results show that models described herein are able to produce representations that can be reused for different downstream tasks, without having access to labelled datasets during training. Further, the small encoder architectures can be potentially deployed on mobile devices.

Example Devices and Systems

Figure 6A:
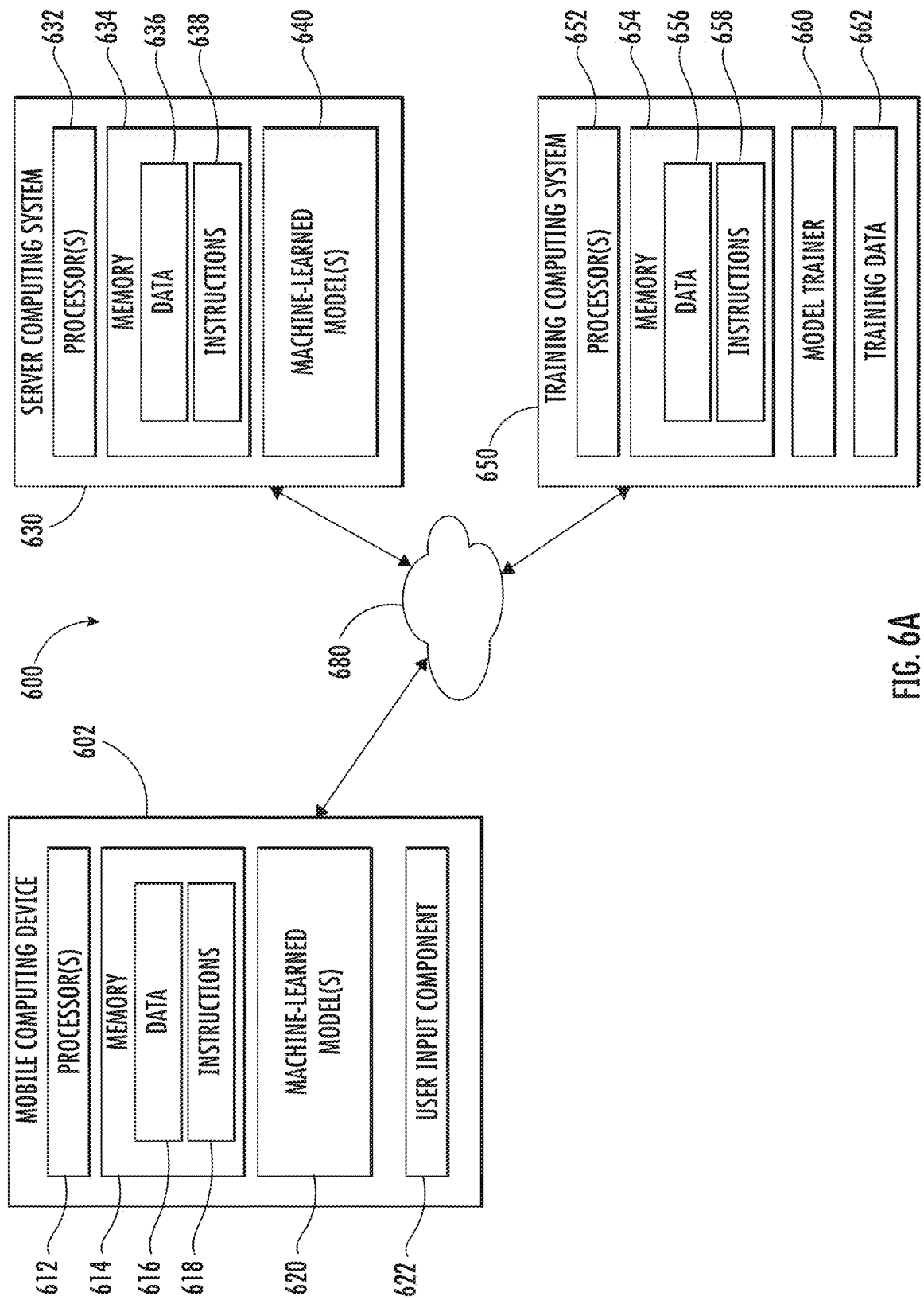
FIG. 6A depicts a block diagram of an example computing system according to example aspects of the present disclosure.

FIG. 6A depicts a block diagram of an example computing system 600 that performs interleaved video object detection according to example aspects of the present disclosure. The system 600 includes a user computing device 602, a server computing system 630, and a training computing system 650 that are communicatively coupled over a network 680.

The user computing device 602 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 602 includes one or more processors 612 and a memory 614. The one or more processors 612 can be any suitable processing device (e.g., a processor core, a microprocessor, an ASIC, a FPGA, a controller, a microcontroller, etc.) and can be one processor or a plurality of processors that are operatively connected. The memory 614 can include one or more non-transitory computer-readable storage mediums, such as RAM, ROM, EEPROM, EPROM, flash memory devices, magnetic disks, etc., and combinations thereof. The memory 614 can store data 616 and instructions 618 which are executed by the processor 612 to cause the user computing device 602 to perform operations.

In some implementations, the user computing device 602 can store or include one or more machine-learned models 620. The one or more machine-learned models 620 can be, for example, one or more machine-learned models for reconstructing portions of an audio signal and/or estimating the distance between two sampled slices of an audio signal. For example, the machine-learned models 620 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 620 and/or components thereof are discussed with reference to FIGS. 1-5.

In some implementations, the one or more machine-learned models 620 can be received from the server computing system 630 over network 680, stored in the user computing device memory 614, and then used or otherwise implemented by the one or more processors 612.

More particularly, as described herein, the machine-learned models 620 can use an encoder network and one or more decoder networks to determine one or more characteristics of an audio signal. For example, in some implementations, the one or more machine-learned models can determine one or more reconstructed portions (e.g., a portion corresponding to a temporal gap between two slices or a preceding and/or successive portion of an audio signal). In some implementations, the one or more machine-learned models can estimate a time distance between two sampled slices.

Additionally or alternatively, one or more machine-learned models 640 can be included in or otherwise stored and implemented by the server computing system 630 that communicates with the user computing device 602 according to a client-server relationship. For example, the machine-learned models 640 can be implemented by the server computing system 640 as a portion of a web service (e.g., an audio signal analysis service). Thus, one or more models 620 can be stored and implemented at the user computing device 602 and/or one or more models 640 can be stored and implemented at the server computing system 630.

The user computing device 602 can also include one or more user input component 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 630 includes one or more processors 632 and a memory 634. The one or more processors 632 can be any suitable processing device (e.g., a processor core, a microprocessor, an ASIC, a FPGA, a controller, a microcontroller, etc.) and can be one processor or a plurality of processors that are operatively connected. The memory 634 can include one or more non-transitory computer-readable storage mediums, such as RAM, ROM, EEPROM, EPROM, flash memory devices, magnetic disks, etc., and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more machine-learned models 640. Example machine-learned models include neural networks or other multi-layer non-linear models. Example neural networks include feed forward neural networks, deep neural networks, recurrent neural networks, and convolutional neural networks. Example models 640 and/or components thereof are discussed with reference to FIGS. 1-5.

The user computing device 602 and/or the server computing system 630 can train the models 620 and/or 640 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, a FPGA, a controller, a microcontroller, etc.) and can be one processor or a plurality of processors that are operatively connected. The memory 654 can include one or more non-transitory computer-readable storage mediums, such as RAM, ROM, EEPROM, EPROM, flash memory devices, magnetic disks, etc., and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models 620 and/or 640 stored at the user computing device 602 and/or the server computing system 630 using various training or learning techniques, such as, for example, SGD, backwards propagation of errors, reinforcement learning, or other techniques as described herein. In some implementations, performing backwards propagation of errors can include performing truncated backpropagation through time. The model trainer 660 can perform a number of generalization techniques (e.g., weight decays, dropouts, etc.) to improve the generalization capability of the models being trained.

In particular, the model trainer 660 can train the machine-learned models 620 and/or 640 based on a set of training data 662. The training data 662 can include, for example, unlabeled audio signals, specific training datasets (e.g., Speech Commands, LibriSpeech, TUT Urban Acoustic Scenes 2018, MUSAN, Bird Audio Detection, Spoken Language Identification, etc.) and/or other training data as described herein.

In some implementations, if the user has provided consent, the training examples can be provided by the user computing device 602. Thus, in such implementations, the model 620 provided to the user computing device 602 can be trained by the training computing system 650 on user-specific data received from the user computing device 602, while protecting the privacy of the individual user's data. In some implementations, this process can be referred to as personalizing the model.

In some implementations, parameters trained locally on a user computing device 602 can be communicated to the server computing system 630 and/or the training computing system 650 in a federated learning context. For example, a plurality of parameter sets from a plurality of user computing devices 602 can be communicated to the server computing system 630 and/or the training computing system 650, and the server computing system 630 and/or the training computing system 650 can train a global set of parameters using the plurality of parameter sets from the plurality of user computing devices 602. The newly trained global set of parameters can then be communicated to the user computing devices 602.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors 652. In other implementations, the model trainer 660 includes one or more sets of computer-executable instructions that are stored in a tangible computer-readable storage medium such as RAM hard disk or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 6A illustrates one example computing system that can be used to implement the present disclosure. Other computing systems can be used as well. For example, in some implementations, the user computing device 602 can include the model trainer 660 and the training dataset 662. In such implementations, the machine-learned models 620 can be both trained and used locally at the user computing device 602. In some implementations, the user computing device 602 can implement the model trainer 660 to personalize the machine-learned models 620 based on user-specific data.

Figure 6B:
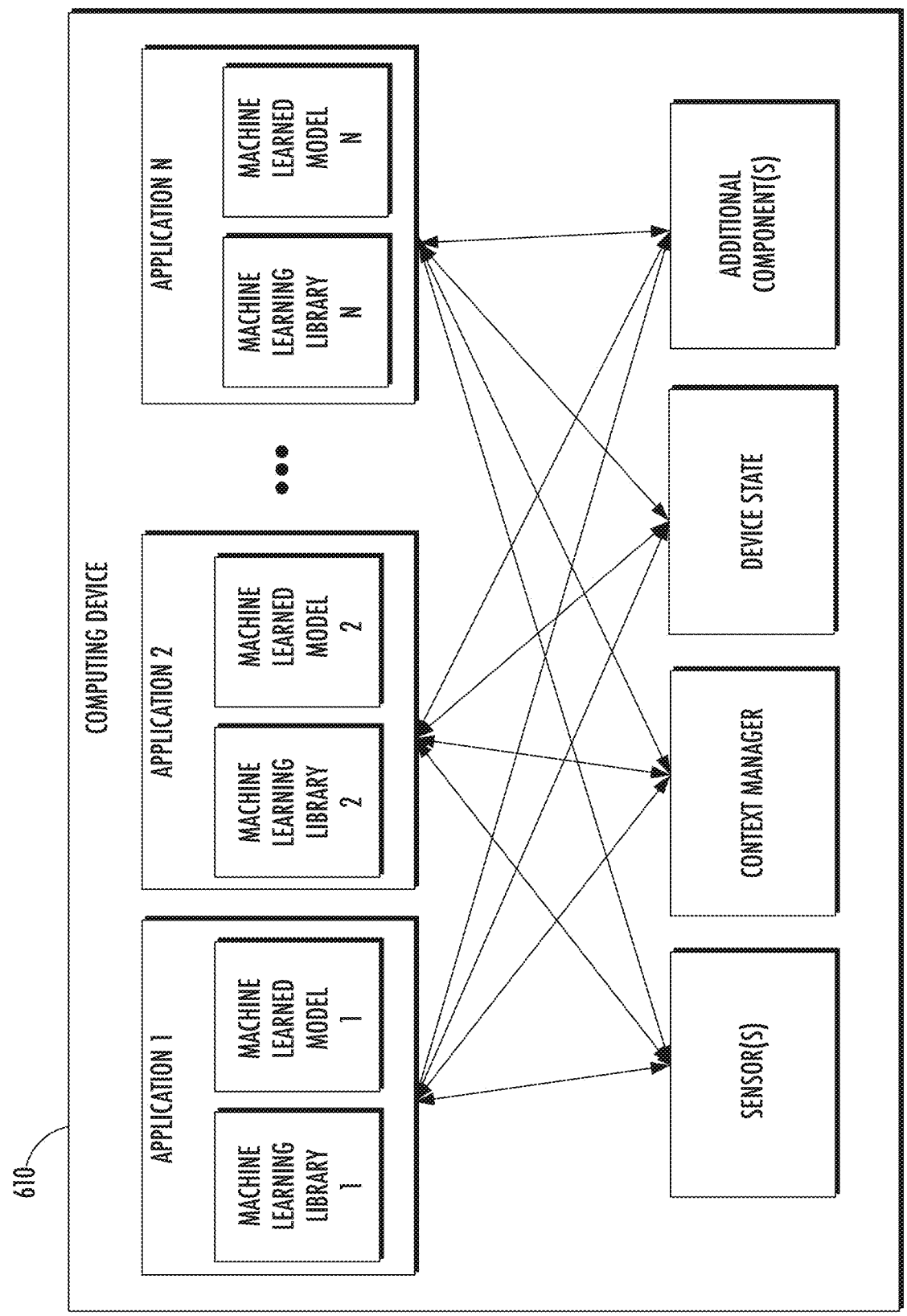
FIG. 6B depicts a block diagram of an example computing device according to example aspects of the present disclosure.

FIG. 6B depicts a block diagram of an example computing device 610 that performs video object detection according to example aspects of the present disclosure. The computing device 610 can be a user computing device or a server computing device.

The computing device 610 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
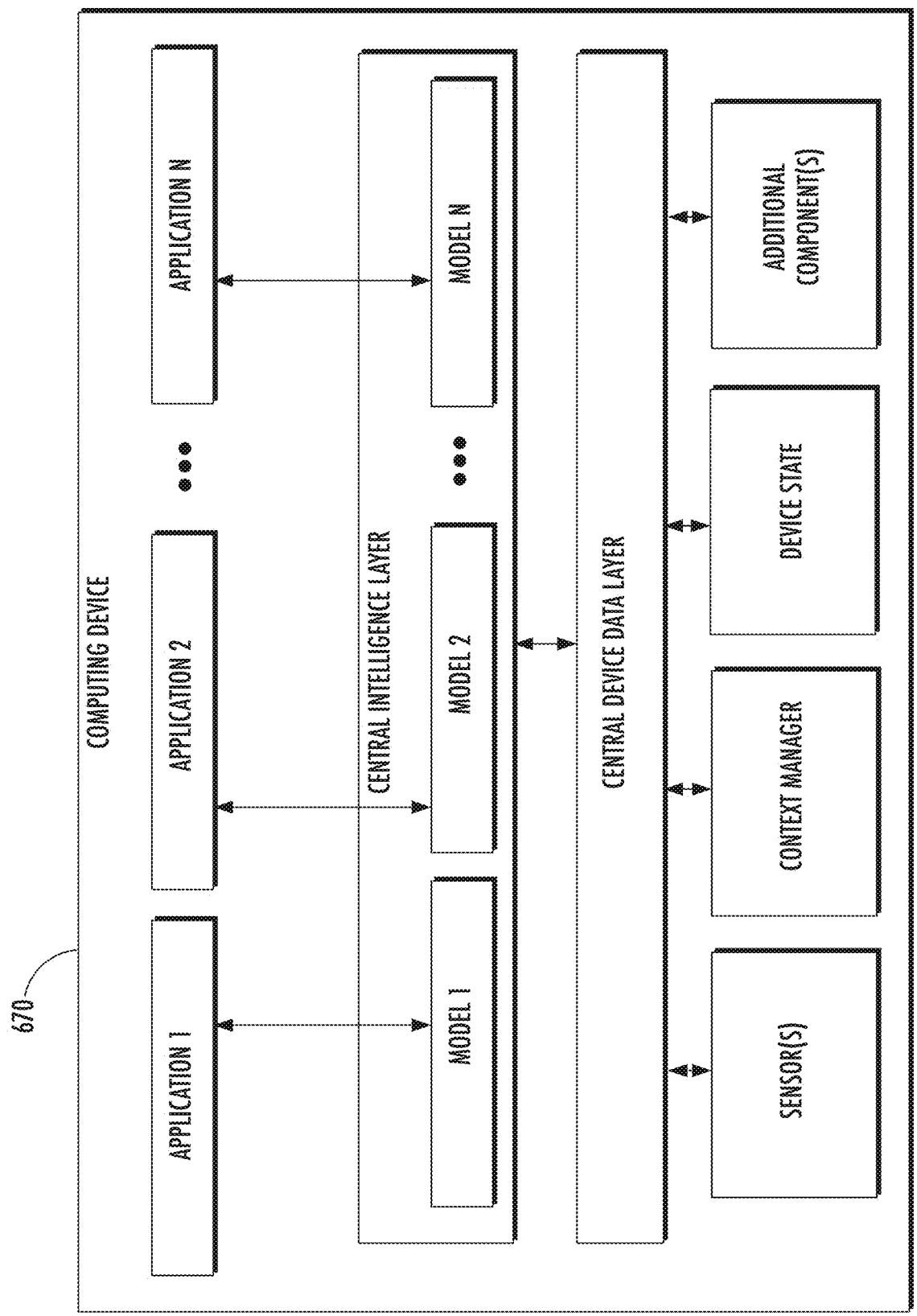
FIG. 6C depicts a block diagram of an example computing device according to example aspects of the present disclosure.

FIG. 6C depicts a block diagram of an example computing device 670 that performs video object detection according to example aspects of the present disclosure. The computing device 670 can be a user computing device or a server computing device.

The computing device 670 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 670.

The central intelligence layer can communicate with a central device data layer. The central device data layer can be a centralized repository of data for the computing device 670. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 7:
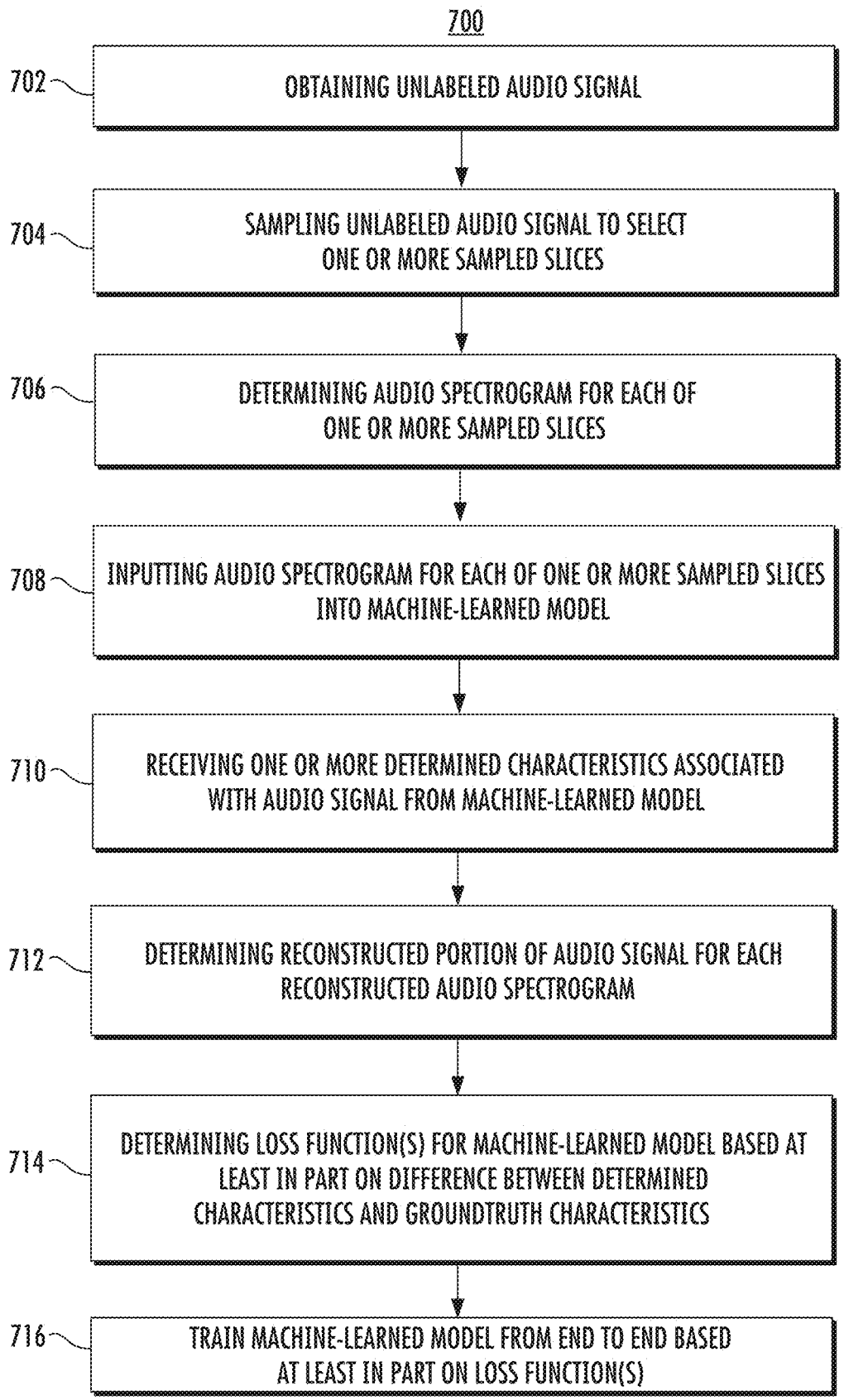
FIG. 7 depicts a flow chart diagram of an example method to train a machine-learned model configured to determine one or more characteristics associated with an audio signal according to example aspects of the present disclosure.

FIG. 7 depicts a flow chart diagram of an example method 700 to train a machine-learned model configured to determine one or more characteristics associated with an audio signal according to example aspects of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, the method 700 can include obtaining an unlabeled audio signal. For example, the unlabeled audio signal can be a part of a training dataset. In some implementations, the audio signal can include one or more training labels, which can be ignored to obtain the unlabeled audio signal.

At 704, the method 700 can include sampling the unlabeled audio signal to select one or more sampled slices. For example, in some implementations, the one or more sampled slices can be randomly selected. In some implementations, the one or more sampled slices can include a single slice. In some implementations, the one or more sampled slices can include two sampled slices separated by a temporal gap.

At 706, the method 700 can include determining an audio spectrogram for each of the one or more sampled slices. For example, in some implementations, the audio spectrogram can be a log-Mel spectrogram, a STFT spectrogram, etc.

At 708, the method 700 can include inputting the one or more sampled slices into a machine-learned model comprising an encoder network and a decoder network. In some implementations, inputting the one or more sampled slices into the machine-learned model can include inputting the audio spectrograms of the one or more sampled slices into the machine-learned model.

In some implementations, the encoder network can include a plurality of convolutional layers, a max pooling layer (e.g., as a global max pooling layer), and a fully connected layer.

In some implementations, the decoder network can include an identical copy of at least a subset of the plurality of convolutional layers arranged in a reverse order. In some implementations, the last convolutional layer can include twice as many output channels, with a first set of the output channels associated with reconstructing a preceding portion of the audio signal and a second set of output channels associated with reconstructing a successive portion of the audio signal.

In some implementations, the decoder network can include an identical copy of at least a subset of the plurality of convolutional layers arranged in a reverse order, with the max pooling layer replaced by a nearest-neighbor up sampling layer.

In some implementations, the encoder network can include a plurality of convolutional layers, wherein a first sample slice and a second sample slice are each input into the encoder network to determine a first embedding representation and a second embedding representation, respectively. Further, the first embedding representation and the second embedding representation can be concatenated into a single vector, and the single vector can be input into a fully connected feed forward network to obtain a scalar output.

In some implementations, the machine-learned model can include a multi-head machine-learned model comprising an encoder network and a plurality of decoder networks, as described herein. For example, each decoder network can be configured to perform a different auxiliary task.

At 710, the method 700 can include receiving, as an output of the machine-learned model, one or more determined characteristics associated with the audio signal. The one or more determined characteristics can include one or more reconstructed portions of the audio signal temporally adjacent to the one or more sampled slices or an estimated distance between two sampled slices.

For example, in some implementations, the one or more sampled slices can include a single sampled slice. Further, the one or more determined characteristics can include a reconstructed preceding portion of the audio signal temporally adjacent to the single sampled slice and a reconstructed successive portion of the audio signal temporally adjacent to the single sampled slice.

In some implementations, the one or more sampled slices can include a first sampled slice and a second sampled slice separated by a temporal gap. Further, the one or more determined characteristics associated with the audio signal can include a reconstructed portion of the audio signal corresponding to a least a portion of the temporal gap. In some implementations, any two successive sampled slices of the one or more sampled slices can include non-overlapping sampled slices separated by one or more temporal frames to reduce or eliminate leakage between the two successive sampled slices during training.

In some implementations, the one or more sampled slices can include a first sampled slice and a second sampled slice separated by a temporal gap, in the one or more determined characteristics can include an estimated time distance between the first sampled slice and the second sampled slice.

At 712, the method 700 can include determining a reconstructed portion of the audio signal for each reconstructed audio spectrogram. For example, one or more reconstructed spectrogram slices can be received as an output of the decoder network, and the machine-learned model can convert the one or more reconstructed slices to one or more respective reconstructed portions of the audio signal.

At 714, the method 700 can include determining a loss function for the machine-learned model based at least in part on a difference between the one or more determined characteristics and one or more corresponding ground truth characteristics of the audio signal.

For example, in some implementations, the corresponding ground truth characteristics of the audio signal can include ground truth portion(s) of the audio signal which are temporally adjacent to the sampled portion(s) of the audio signal, which can correspond to the reconstructed portion(s) of the audio signal.

In some implementations, the one or more corresponding ground truth characteristics of the audio signal can include a ground truth temporal gap corresponding to an estimated time distance between two sampled slices.

In some implementations, the loss function can include a mean-square error loss function determined based at least in part on a difference between a ground truth portion of the audio signal and a reconstructed portion of the audio signal.

In some implementations, the loss function can include an average mean-square error loss function determined based at least in part on a difference between a first ground truth portion and a reconstructed preceding portion of the audio signal and a difference between a second ground truth portion and a reconstructed successive portion of the audio signal.

In some implementations, the loss function can include a cross-entropy loss between a ground truth temporal gap and an estimated time distance between a first sampled slice and a second sampled slice.

In some implementations, the loss function can include a plurality of task-specific loss functions associated with a respective decoder network. For example, each decoder network and a multi-head machine-learned model can have a respective task-specific loss function.

At 716, the method 700 can include training the machine-learned model from end to end based at least in part on the loss function. For example, in various implementations, SGD can be performed using one or more loss functions, as described herein.

In some implementations, training the machine-learned model from end to end based at least in part on the loss function can include training a multi-head machine-learned model from end to end based at least in part on each of the respective task-specific loss functions.

Figure 8:
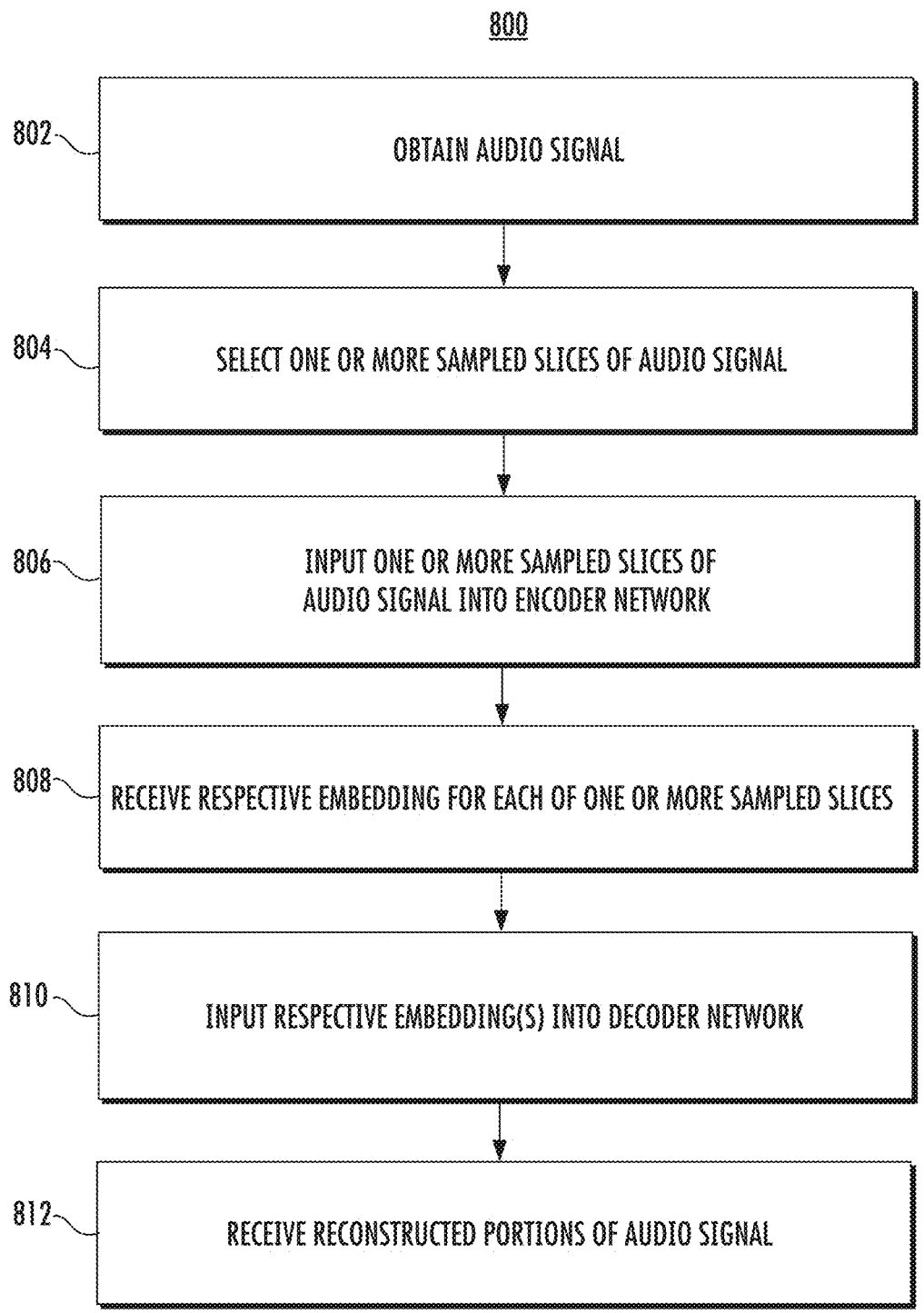
FIG. 8 depicts a flow chart diagram of an example method to reconstruct one or more audio portions using a machine-learned model according to example aspects of the present disclosure.

FIG. 8 depicts a flow chart diagram of an example method 800 to example method to reconstruct one or more audio portions using a machine-learned model according to example aspects of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, the method 800 can include obtaining an audio signal. For example, a user can select a particular audio signal to input into the machine-learned model to reconstruct one or more portions of the audio signal.

At 804, the method 800 can include selecting one or more sampled slices of the audio signal. For example, in some implementations, the one or more sampled slices can be one or more sampled slices temporally adjacent to a portion of the audio signal that a user would like to reconstruct using the machine-learned model.

At 806, the method 800 can include inputting the one or more sampled slices of the audio signal into an encoder network of the machine-learned model. For example, the encoder network can include a plurality of convolutional layers. Further, the encoder network can be trained to receive one or more sampled slices of an audio signal and output a respective embedding for each of the one or more sampled slices.

At 808, the method can include receiving, as an output of the encoder network, the respective embedding for each of the one or more sampled slices of the audio signal.

At 810, the method 800 can include inputting the respective embedding for each of the one or more sampled slices of the audio signal into the decoder network of the machine-learned model. For example, the decoder network can include an identical copy of at least a subset of the plurality of convolutional layers arranged in a reverse order. Further, the decoder network can be trained to receive the respective embedding for each of the one or more sampled slices of the audio signal and output one or more reconstructed portions of the audio signal.

At 812, the method 800 can include receiving, as an output of the decoder network, the one or more reconstructed portions of the audio signal. For example, the one or more reconstructed portions of the audio signal can correspond to one or more portions of the audio signal temporally adjacent to the one or more sampled slices of the audio signal.

Further, according to additional aspects of the present disclosure, the machine-learned model can have been trained from end to and using a training dataset comprising unlabeled audio signals and a mean-square error loss function.

In some implementations, the one or more sampled slices can include a single sampled slices, and the one or more reconstructed portions of the audio signal can include a reconstructed preceding portion of the audio signal temporally adjacent to the single sampled slice and a reconstructed successive portion of the audio signal temporally adjacent to the single sampled slice.

In some implementations, the one or more sampled slices can include a first sampled slice and a second sampled slice separated by a temporal gap, and the one or more reconstructed portions of the audio signal can include a reconstructed portion of the audio signal corresponding to at least a portion of the temporal gap.

In some implementations, the method 800 can be performed by a mobile computing device (e.g., a smartphone).

Figure 9:
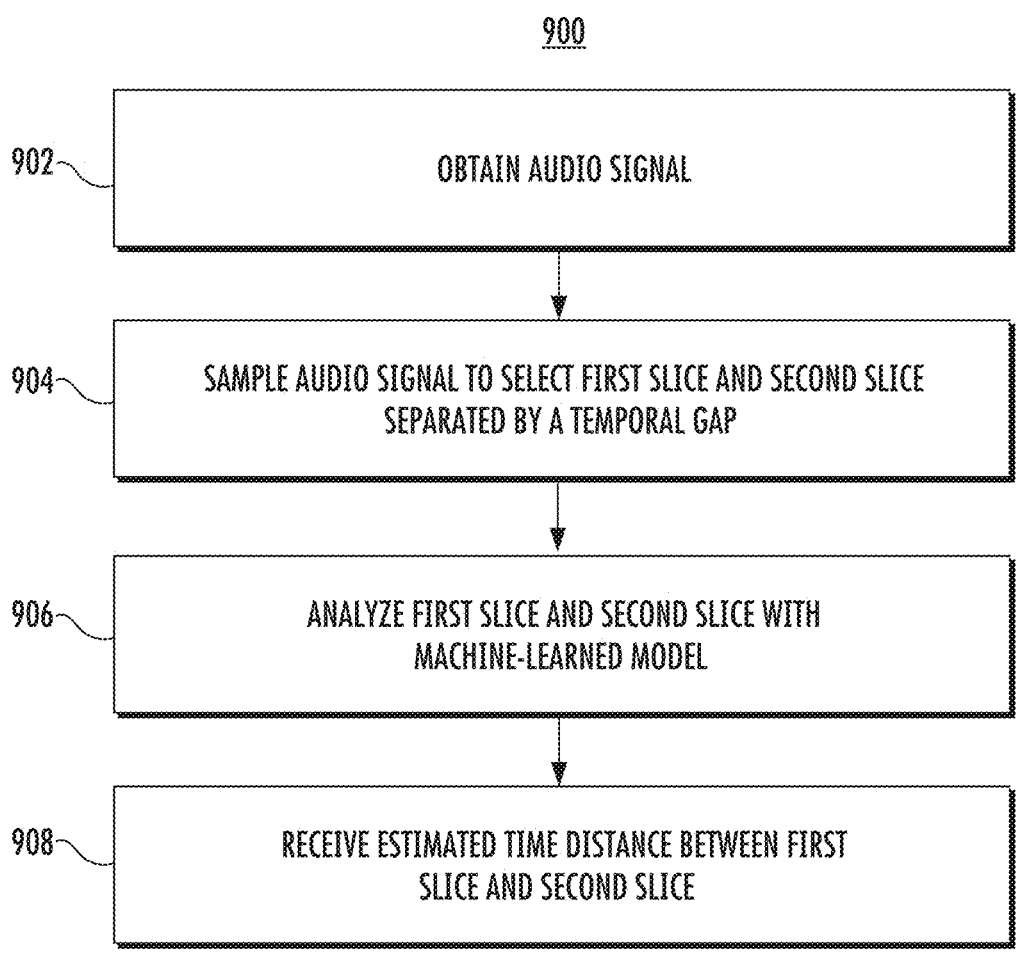

FIG. 9 depicts a flow chart diagram of an example method 900 to estimate a distance between two audio slices using a machine-learned model according to example aspects of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, the method 900 can include obtaining an audio signal. For example, a user can select a particular audio signal to input into the machine-learned model.

At 904, the method 900 can include sampling the audio signal to select a first sampled slice and a second sampled slice separated by a temporal gap. For example, in some implementations, a user can select which slices of the audio signal to sample.

At 906, the method can include analyzing the first sampled slice and the second sampled slice with a machine-learned model. For example, the machine-learned model can include an encoder network and a decoder network. Further, the machine-learned model can have been trained from end to end using unlabeled audio signals and a cross-entropy loss function.

In some implementations, analyzing the first sampled slice and the second sampled slice can include inputting each respective sampled slice into the encoder network to receive a first embedding representation and a second embedding representation respectively, concatenating the first embedding representation and the second embedding representation into a single vector, and inputting the single vector into a fully connected feed forward network.

At 908, the method 900 can include receiving, as an output of the machine-learned model, the estimated time distance between the first sampled slice and the second sampled slice. For example, in some implementations, a scalar output indicative of the estimated time distance between the two sampled slices can be received as an output of the fully connected forward network.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A method for training a machine-learned model configured to determine one or more characteristics associated with an audio signal, comprising:
   obtaining an audio signal, the audio signal comprising an unlabeled audio signal;
   sampling the audio signal to select one or more sampled slices;
   inputting the one or more sampled slices into a machine-learned model comprising an encoder network and decoder network;
   receiving, as an output of the machine-learned model, one or more determined characteristics associated with the audio signal, the one or more determined characteristics comprising one or more reconstructed portions of the audio signal temporally adjacent to the one or more sampled slices or an estimated distance between two sampled slices;
   determining a mean square error a loss function for the machine-learned model based at least in part on a difference between a first ground truth portion of the audio signal and a reconstructed preceding portion, and a difference between a second ground truth portion of the audio signal and a reconstructed successive portion of the audio signal; and
   training the machine-learned model from end to end based at least in part on the loss function.

2. The method of claim 1, wherein the one or more sampled slices comprise a single sampled slice; and
   wherein the one or more determined characteristics comprise a reconstructed preceding portion of the audio signal temporally adjacent to the single sampled slice and a reconstructed successive portion of the audio signal temporally adjacent to the single sampled slice.

3. The method of claim 2, wherein the encoder network comprises a plurality of convolutional layers, a max pooling layer, and a fully connected layer;
   wherein the decoder network comprises an identical copy of at least a subset of the plurality of convolutional layers arranged in a reverse order, wherein the last convolutional layer comprises twice as many output channels; and
   wherein a first set of the output channels is associated with the reconstructed preceding portion of the audio signal and a second set of the output channels is associated with the reconstructed successive portion of the audio signal.

4. The method of claim 2, wherein the one or more corresponding ground truth characteristics of the audio signal comprise the first ground truth portion of the audio signal corresponding to the reconstructed preceding portion of the audio signal and the second ground truth portion of the audio signal corresponding to the reconstructed successive portion of the audio signal; and
   wherein the loss function comprises an average mean-square error loss function.

5. The method of claim 1, wherein the one or more sampled slices comprise at least a first sampled slice and a second sampled slice separated by a temporal gap; and
   wherein the one or more determined characteristics associated with the audio signal comprise a reconstructed portion of the audio signal corresponding to at least a portion of the temporal gap.

6. The method of claim 5, wherein any two successive sampled slices of the one or more sampled slices comprise non-overlapping sampled slices separated by one or more temporal frames to reduce or eliminate leakage between the two successive sampled slices during training.

7. The method of claim 5, wherein the encoder network comprises a plurality of convolutional layers, a max pooling layer, and a fully connected layer; and
   wherein the decoder network comprises an identical copy of at least a subset of the plurality of convolutional layers arranged in a reverse order, with the max pooling layer replaced by a nearest-neighbor upsampling layer.

8. The method of claim 5, wherein the one or more corresponding ground truth characteristics of the audio signal comprise a ground truth portion of the audio signal corresponding to the reconstructed portion of the audio signal; and
   wherein the loss function comprises a mean-square error loss function determined based at least in part on a difference between the ground truth portion of the audio signal and the reconstructed portion of the audio signal.

9. The method of claim 1, wherein the one or more sampled slices comprise a first sampled slice and a second sampled slice separated by a temporal gap; and wherein the one or more determined characteristics comprise an estimated time distance between the first sampled slice and the second sampled slice.

10. The method of claim 9, wherein the encoder network comprises a plurality of convolutional layers;
    wherein the first sampled slice and the second sampled slice are each input into the encoder network to determine a first embedding representation and a second embedding representation, respectively;
    wherein the first embedding representation and the second embedding representation are concatenated into a single vector; and
    wherein the single vector is input into a fully connected feed forward network to obtain a scalar output.

11. The method of claim 9, wherein the one or more corresponding ground truth characteristics of the audio signal comprise a ground truth temporal gap; and
    wherein the loss function comprises a cross-entropy loss between the ground truth temporal gap and the estimated time distance between the first sampled slice and the second sampled slice.

12. The method of claim 1, wherein sampling the audio signal to select one or more sampled slices comprises determining an audio spectrogram for each of the one or more sampled slices; and
    wherein inputting the one or more sampled slices into the machine-learned model comprises inputting the respective audio spectrogram for each of the one or more sampled slices into the machine-learned model.

13. The method of claim 12, wherein the one or more determined characteristics comprise the one or more portions of the audio signal;
    wherein receiving, as an output of the machine-learned model, the one or more determined characteristics associated with the audio signal, comprises receiving, as an output of the machine-learned model, a respective reconstructed audio spectrogram for each of the one or more sampled slices; and wherein the method further comprises determining a respective reconstructed portion of the audio signal for each of the reconstructed audio spectrograms.

14. The method of claim 1, wherein the machine-learned model comprises a multi-head machine-learned model comprising the encoder network and a plurality of decoder networks;

wherein each decoder network is configured to perform a different auxiliary task;

wherein the one or more sampled slices are input into the encoder network to obtain one or more embeddings;

wherein the one or more embeddings are input into each decoder network to obtain one or more respective determined characteristics associated with the audio signal for each different auxiliary task;

wherein determining a loss function for the machine-learned model based at least in part on a difference between the one or more determined characteristics and one or more corresponding ground truth characteristics of the audio signal comprises determining a respective task-specific loss function associated with each decoder network based at least in part on a difference between the one or more respective determined characteristics and one or more respective corresponding ground truth characteristics of the audio signal; and wherein training the machine-learned model from end to end based at least in part on the loss function comprises training the machine-learned model from end to end based at least in part on each of the respective task-specific loss functions.

15. A computing system, comprising:

at least one processor;

a machine-learned audio reconstruction model comprising:
  an encoder network, the encoder network comprising a plurality of convolutional layers, wherein the encoder network is trained to receive one or more sampled slices of an audio signal and output a respective embedding for each of the one or more sampled slices of the audio signal; and
  a decoder network, the decoder network comprising an identical copy of at least a subset of the plurality of convolutional layers arranged in a reverse order; wherein the decoder network is trained to receive the respective embedding for each of the one or more sampled slices of the audio signal and output one or more reconstructed portions of the audio signal; and at least one tangible, non-transitory computer-readable medium that stores instructions that, when executed by the at least one processor, cause the at least one processor to perform operations, the operations comprising:
  obtaining the audio signal;
  selecting the one or more sampled slices of the audio signal;
  inputting the one or more sampled slices of the audio signal into the encoder network of the machine-learned model;
  receiving, as an output of the encoder network, the respective embedding for each of the one or more sampled slices of the audio signal;
  inputting the respective embedding for each of the one or more sampled slices of the audio signal into the decoder network of the machine-learned model; and
  receiving, as an output of the decoder network, the one or more reconstructed portions of the audio signal;

wherein the one or more reconstructed portions of the audio signal correspond to one or more portions of the audio signal temporally adjacent to the one or more sampled slices of the audio signal; and wherein the machine-learned audio reconstruction model has been trained from end to end using a training dataset comprising unlabeled audio signals and a mean square error loss function based at least in part on a difference between a first ground truth portion of the audio signal and a reconstructed preceding portion, and a difference between a second ground truth portion of the audio signal and a reconstructed successive portion of the audio signal.

16. The computing system of claim 15, wherein the one or more sampled slices comprise a single sampled slice; and wherein the one or more reconstructed portions of the audio signal comprise a reconstructed preceding portion of the audio signal temporally adjacent to the single sampled slice and a reconstructed successive portion of the audio signal temporally adjacent to the single sampled slice.

17. The computing system of claim 15, wherein the one or more sampled slices comprise at least a first sampled slice and a second sampled slice separated by a temporal gap; and wherein the one or more reconstructed portions of the audio signal comprise a reconstructed portion of the audio signal corresponding to at least a portion of the temporal gap.

18. The computing system of claim 15, wherein the computing system comprises a mobile computing device.

* * * * *